(12) United States Patent
Dumons

(10) Patent No.: US 11,236,273 B2
(45) Date of Patent: Feb. 1, 2022

(54) PROCESS AND DEVICE FOR PRODUCING ENERGY PRODUCTS BY CATALYTIC CRACKING OF A HYDROCARBON-BASED SOLID MATERIAL WITHOUT COKE FORMATION

(71) Applicants: D.M.S, Toulouse (FR); Reinhard Lenzinger, Widnau (CH)

(72) Inventor: Pierre Dumons, Toulouse (FR)

(73) Assignees: Reinhard Lenzinger, Widnau (CH); D. M. S, Toulouse (FR)

( * ) Notice: Subject to any disclaimer, the term of this patent is extended or adjusted under 35 U.S.C. 154(b) by 41 days.

(21) Appl. No.: 16/475,292

(22) PCT Filed: Dec. 22, 2017

(86) PCT No.: PCT/EP2017/084512
§ 371 (c)(1),
(2) Date: Jul. 1, 2019

(87) PCT Pub. No.: WO2018/127438
PCT Pub. Date: Jul. 12, 2018

(65) Prior Publication Data
US 2019/0330537 A1    Oct. 31, 2019

(30) Foreign Application Priority Data
Jan. 3, 2017 (FR) ..................... 17 50037

(51) Int. Cl.
*C10G 1/08* (2006.01)
*B01J 8/08* (2006.01)
*B01J 8/10* (2006.01)

(52) U.S. Cl.
CPC .............. *C10G 1/083* (2013.01); *B01J 8/085* (2013.01); *B01J 8/087* (2013.01); *B01J 8/10* (2013.01);
(Continued)

(58) Field of Classification Search
CPC .................. C10G 1/08; B01J 8/10; B01J 8/08
See application file for complete search history.

(56) References Cited

U.S. PATENT DOCUMENTS

2005/0115871 A1  6/2005 Koch
2009/0267349 A1* 10/2009 Spitzauer ................. C10G 1/08
290/52

FOREIGN PATENT DOCUMENTS

CN    1188358    9/2005
CN  102083943    6/2011
(Continued)

OTHER PUBLICATIONS

International Search Report dated Mar. 26, 2018.
Search Report dated Jun. 26, 2018.
Chinese Office Action dated Dec. 22, 2020.

*Primary Examiner* — Youngsul Jeong
(74) *Attorney, Agent, or Firm* — Ipsilon USA, LLP

(57) ABSTRACT

The invention relates to a process for producing energy products, notably fuel, by catalytic cracking of a hydrocarbon-based solid material without coke formation, in which a cracking dispersion (40) is heated, said dispersion comprising:
 a solid material (1) in divided form containing at least one hydrocarbon-based compound;
 a liquid (30) which is inert with respect to catalytic cracking;
so that the cracking dispersion (40) reaches a temperature suitable for allowing catalytic cracking of at least one hydrocarbon-based compound;
characterized in that the cracking temperature is reached by mixing an amount of cracking dispersion (40) and an amount of inert liquid (30) brought to a temperature above the cracking temperature, such that the mixture formed reaches a temperature above the cracking temperature and
(Continued)

below the temperature for formation of coke, dioxin and furan. The invention also relates to a device for performing such a process.

9 Claims, 5 Drawing Sheets

(52) U.S. Cl.
CPC ............... *B01J 2208/00477* (2013.01); *B01J 2208/00787* (2013.01); *C10G 2300/1003* (2013.01); *C10G 2300/1014* (2013.01); *C10G 2300/70* (2013.01); *C10G 2400/04* (2013.01); *C10G 2400/06* (2013.01); *C10G 2400/26* (2013.01)

(56) References Cited

FOREIGN PATENT DOCUMENTS

| WO | 2009/066251 | 5/2009 | |
|---|---|---|---|
| WO | WO-2009066251 A1 * | 5/2009 | .............. F24V 40/00 |
| WO | 2016071208 | 5/2016 | |

* cited by examiner

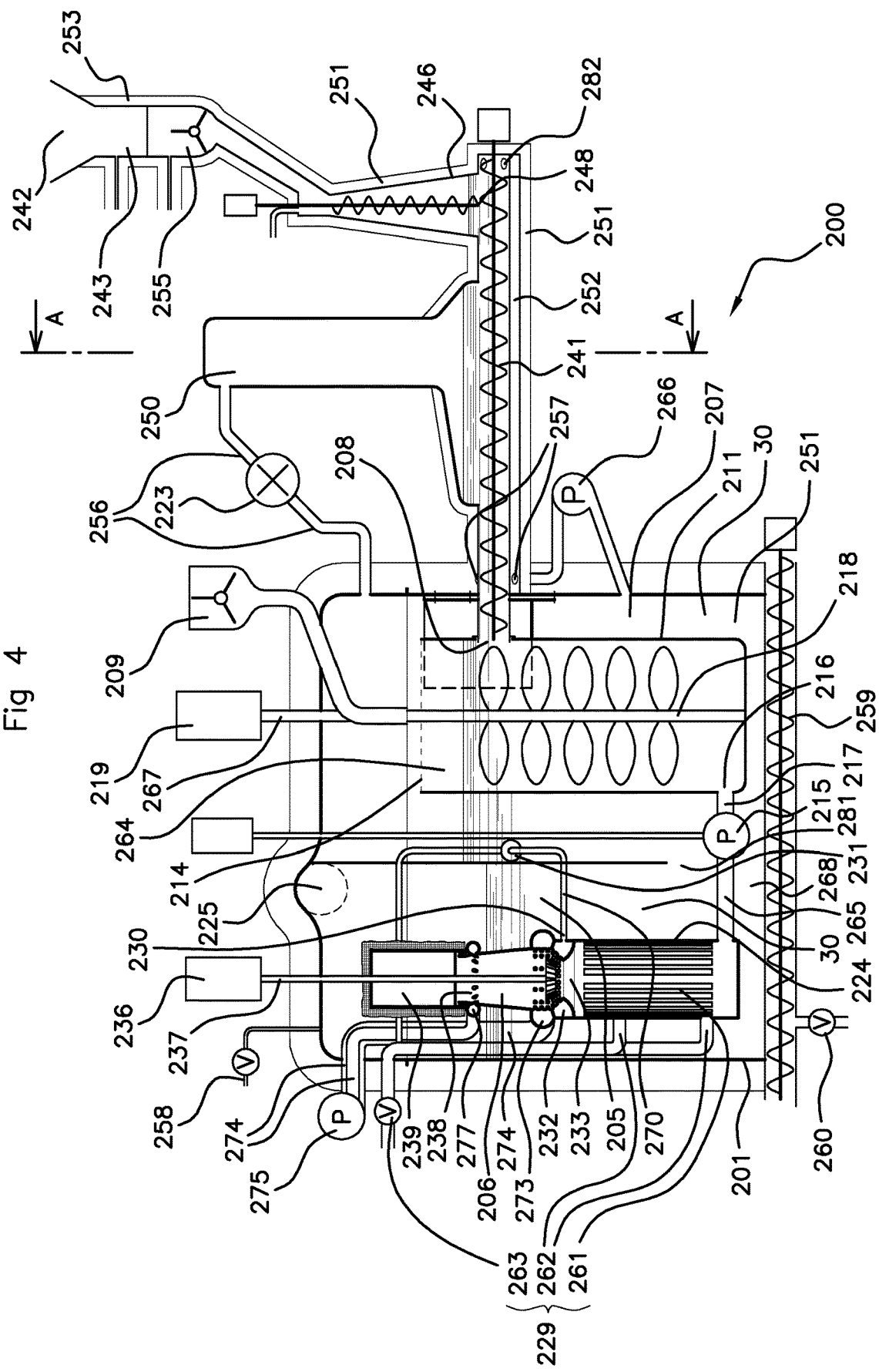

PROCESS AND DEVICE FOR PRODUCING ENERGY PRODUCTS BY CATALYTIC CRACKING OF A HYDROCARBON-BASED SOLID MATERIAL WITHOUT COKE FORMATION

RELATED APPLICATION

This application is a National Phase of PCT/EP2017/084512, filed on Dec. 22, 2017, which claims the benefit of priority from French Patent Application No. 17 50037, filed on Jan. 3, 2017, the entirety of which are incorporated by reference.

BACKGROUND

Field of the Invention

The invention relates to a process and a device for producing energy products, notably fuel, by catalytic cracking of a hydrocarbon-based solid material, notably waste material, without coke formation. The invention relates in particular to a process and a device for producing short-chain "fuel", "diesel" or "kerosene" hydrocarbons, comprising a number of carbon atoms of between 1 ($CH_4$) and 18 ($C_{18}H_{38}$), which are suitable and intended for use as fuel for a diesel engine or for a turbojet engine or a turbocompressor. The invention relates to such a process and such a device for upgrading waste material containing biomass.

Description of Related Art

Throughout the text:
the term "hydrocarbon-based material" denotes a material comprising at least one hydrocarbon-based compound, i.e. a compound formed essentially from carbon atoms and hydrogen atoms. Such a hydrocarbon-based material may also comprise other elements chosen, for example, from at least one oxygen atom, at least one nitrogen atom, at least one phosphorus atom, at least one sulfur atom and/or at least one halogen atom, etc. The term "hydrocarbon-based material" in particular denotes a material comprising biomass;
the term "waste material" denotes the part of a material which in practice is not used, requiring storage and/or appropriate reprocessing for the purpose of storing it. It may be, for example, industrial waste material, agricultural waste material, such as plant parts that are not exploited, or household waste material of complex composition.

Processes are known for producing fuel by catalytic cracking of hydrocarbon-based waste material. For example, US 2009/267349 discloses a device for converting waste material into fuel, comprising a heat-exchange member with dispersion of the waste material in an inert oil.

A process and a device for the catalytic cracking of hydrocarbons of a suspension of hydrocarbon-based waste material heated by means of a friction turbine to a temperature of between 300° C. and 400° C. in the presence of catalysts based on aluminium silicates doped with alkali metals is also known (US 2005/115871). However, to reach this temperature at the core of the suspension, at least a portion of the suspension is necessarily heated on contact with the vanes of the friction turbine to a temperature, notably to a temperature of the order of 400° C., greater than or equal to the temperature of coke formation. This results in the inevitable formation of coke, which becomes deposited in particular on the vanes of the friction turbine and a considerable loss in heating efficiency. Complete stoppage of the installation is then necessary in order to dismantle the friction turbine and perform maintenance and/or restoration thereon.

In addition, the device described in said document comprises a chamber for suspension of hydrocarbon-based waste material in inert oil, a pipe for conveying the suspension formed to the inlet of the friction turbine, an underlying reservoir for collecting the inert oil and solid residues. It is complex in its structure, difficult to insulate thermally and expensive to construct. It does not, in practice, allow the establishment of a regular circulation of the hydrocarbon-based waste material and of the inert oil in a short circuit, maintained by a single, reliable pumping means. Nor does it make it possible to limit the heat losses, and as such all of the energy required for the catalytic cracking reaction is entirely provided by the friction turbine. Nor does it make it possible to control the exothermic combustion of the dihydrogen ($H_2$) produced during the catalytic cracking. It thus does not make it possible to control the suspension temperature during catalytic cracking, which increases as a result of the exothermic combustion reaction of dihydrogen and inevitably leads to the formation of coke. The process is also complex in its implementation.

OBJECTS AND SUMMARY

The invention is directed towards overcoming all of these drawbacks.

The invention is thus directed towards proposing a process and a device for producing energy products, notably fuel, by catalytic cracking of a hydrocarbon-based solid material, notably waste material, which are simple enough and reliable enough in their implementation and in their use to allow exploitation at the industrial scale.

The invention is directed in particular towards proposing such a process and such a device that are able to be at least partially automated.

The invention is directed in particular towards proposing such a process which makes it possible to avoid the formation of coke, dioxins and furans.

The invention is thus directed towards proposing such a process and such a device for durably maintaining the efficiency of heating and the yield of the catalytic cracking reaction.

The invention is also directed towards proposing such a process and such a device in which the heat energy supplies are minimized and in which the overall energy balance for the production of energy products, notably of fuel, is optimized.

The invention is also directed towards proposing such a process and such a device which make it possible to reduce the number, frequency and duration of the steps of maintenance of the device for producing energy products, notably fuel.

The invention is also directed towards proposing a process and a device for producing energy products, notably fuel, by catalytic cracking of a hydrocarbon-based solid material allowing continuous production of energy products, notably of fuel.

The invention is directed in particular towards proposing a process and a device for producing energy products, notably fuel, which do not necessitate the stoppage of the device in order to refill it with hydrocarbon-based solid material and/or with reagents.

The invention is directed in particular towards proposing such a process and such a device which are suitable for promoting the reactivity of the hydrocarbon-based solid material for the purposes of its catalytic cracking.

The invention is directed in particular towards proposing such a device which takes up little space.

The invention is also directed towards proposing such a device which makes it possible to minimize the manufacturing cost of the device.

The invention is also directed towards proposing such a device which is of low construction cost, also making it possible to minimize the cost of production of energy products, notably of fuel.

To do this, the invention relates to a process for producing energy products, notably fuel, by catalytic cracking of a hydrocarbon-based solid material, notably of waste material, in which a dispersion, named cracking dispersion, is heated, said dispersion comprising:
- a solid material in divided form containing at least one hydrocarbon-based compound;
- at least one catalyst, notably a solid catalyst in divided form, for catalytic cracking;
- at least one alkaline compound; and
- a liquid which is inert with respect to catalytic cracking, i.e. a liquid chosen so as not to undergo any chemical modification during catalytic cracking;

such that said cracking dispersion reaches a temperature, named cracking temperature, which is suitable to allow catalytic cracking of at least one, notably of each, hydrocarbon-based compound of said cracking dispersion, leading to a production of hydrocarbons, named short-chain hydrocarbons, of lower molecular mass than said hydrocarbon-based compound;

characterized in that said cracking temperature is reached by mixing an amount of said cracking dispersion and an amount of inert liquid which is substantially free of solid material in divided form and of catalyst, the inert liquid being brought to a temperature above said cracking temperature, said mixing being performed such that the mixture formed reaches a temperature at least equal to said cracking temperature and below a coke formation temperature, notably below 400° C., preferably below 360° C.

The invention thus relates to a process for producing energy products, notably fuel, by catalytic cracking of at least one and notably of each hydrocarbon-based compound of a solid material in divided form, excluding the formation of coke, dioxins and furans.

Advantageously, in one embodiment of a process according to the invention, said short-chain hydrocarbons are hydrocarbons comprising a number of carbon atoms of between 1 and 18. In particular, said short-chain hydrocarbons are hydrocarbons with a hydrocarbon-based chain comprising a number of carbon atoms of between 1 ($CH_4$) and 18 ($C_{18}H_{38}$).

The inventors have observed that the mixing:
- of an amount of said cracking dispersion brought to a temperature below the cracking temperature (the cracking temperature being between 240° C. and 340° C., notably between 280° C. and 340° C., depending on the solid material in divided form) and below any coke formation temperature (i.e. below 400° C. in the absence of any prior deposition of coke and/or of soot, but below 360° C. in the presence of such a deposit of coke and/or of soot) and without having recourse to heat exchange by conduction with a hot wall at a temperature above the coke formation temperature, and which therefore does not allow either the cracking of hydrocarbon-based compound(s) of the solid material in divided form or the formation of coke; and
- of an amount of inert liquid brought to a temperature above the cracking temperature, but which does not allow the formation of coke given that the inert liquid is free of solid material in divided form and of catalyst and that its temperature is below a temperature of 360° C.;

makes it possible in reality, by controlling the amounts (and/or flow rates) of said cracking dispersion and of inert liquid and the respective temperatures thereof, to form energy products, notably fuel, without forming coke, or dioxins or furans.

In a process according to the invention, via this mixing, said cracking suspension is heated to a temperature of between 240° C. and 340° C., notably between 280° C. and 340° C. (depending on the solid material in divided form), bringing about cracking but without forming the coke deposit on a heating surface of a heating device and without loss of performance of this heating device.

Advantageously, before said mixing, said cracking dispersion is at a temperature below the coke formation temperature. Advantageously, said mixing is performed so as to reach a temperature at least equal to said cracking temperature and below the coke formation temperature. Advantageously, said cracking temperature is below the dioxin formation temperature and below the furan formation temperature.

In a process according to the invention, contrary to the known processes, said cracking dispersion is not placed in contact with a heating surface of a heating device whose temperature is necessarily greater than or equal to 360° C., notably greater than or equal to 400° C., to be able to heat said cracking dispersion and so that it reaches at the core a temperature at least equal to the cracking temperature (which is itself between 240° C. and 340° C., notably between 280° C. and 340° C., depending on the solid material in divided form). In such a known process, the cracking dispersion is brought into contact with the heating surface of a heating device at a temperature which, in order to reach the cracking temperature of between 280° C. and 340° C., is necessarily above the temperature for formation of coke, dioxins and furans and leads to the formation of coke, dioxins and furans.

Advantageously and according to the invention, the inert liquid comprises at least one mineral oil, in particular at least one mineral oil which is inert with respect to catalytic cracking and stable at the cracking temperature. Advantageously and according to the invention, the inert liquid is formed from a mineral oil. Advantageously, the inert liquid is liquid at the cracking temperature. Advantageously, the inert liquid is also liquid at ambient temperature. The inert liquid has a density less than the density of the catalyst and less than the density of the hydrocarbon-based solid material. Advantageously, according to certain embodiments, the mineral oil has a density of the order of 0.85. Advantageously, according to certain embodiments, the mineral oil is in liquid form at a temperature of 0° C.

Advantageously and according to the invention, at least one catalyst is a catalyst for the catalytic cracking reaction of hydrocarbon-based compounds, notably of hydrocarbons. Advantageously and according to the invention, at least one catalyst is chosen from the group formed from potassium silicates, sodium silicates, calcium silicates and magnesium aluminium silicates. Other cracking catalysts may be used.

Such catalysts are also inexpensive catalysts. Advantageously and according to the invention, at least one catalyst is a solid in divided form.

Advantageously and according to the invention, said cracking dispersion comprises at least one alkaline compound, notably lime, or calcium oxide (CaO), in a suitable amount so that the pH of said cracking dispersion is greater than 8.5. Such a pH value makes it possible firstly to promote, notably to allow, the catalytic cracking reaction of at least one, notably of each, hydrocarbon-based compound of the solid material in divided form. Such a pH value also makes it possible to limit the corrosion of the elements of the device placed in contact with said cracking dispersion. Such a pH value also makes it possible to perform catalytic cracking of chlorinated hydrocarbon-based compounds. Advantageously and according to the invention, said cracking dispersion comprises lime as alkaline compound.

The catalytic cracking reaction of hydrocarbon-based compounds leads to a production of short-chain hydrocarbons in gaseous form at the cracking temperature, of dihydrogen ($H_2$) in gaseous form, of carbon dioxide in gaseous form and of water vapour. The catalytic cracking reaction has the consequence of releasing the catalyst(s), which is (are) instantly capable of combining again with at least one hydrocarbon-based compound of the solid material in divided form and of forming short-chain hydrocarbons by catalytic cracking.

These compounds in gaseous form formed during the catalytic cracking reaction form with the inert liquid a foam in expansion in the cracking chamber.

Purely by way of example, the catalytic cracking of cellulose, of formula $(C_6H_9O_5)_n$ (n being an integer) leads to the formation of 2.5n molecules of carbon dioxide ($CO_2$), 3.5 methylene groups $(CH_2)_n$ in the form of a short-chain hydrocarbon and of n molecules of dihydrogen ($H_2$). The dihydrogen produced during the reaction for the catalytic cracking of cellulose allows:

hydrogenation of unsaturated hydrocarbons to saturated hydrocarbons; and a reduction in the sulfur released in the form of $H_2S$ during the catalytic cracking.

Advantageously, in certain particular embodiments of a process according to the invention, household refuse is subjected to compression to a pressure of greater than 750 bar under conditions suitable for extracting a fermentable fraction in the form of a wet pulp and for forming the hydrocarbon-based solid material, notably the waste material. Such a compression is achieved, in particular, by means of an extrusion press, notably as described in EP 0 563 173.

Advantageously, in certain particular embodiments of a process according to the invention, a preliminary step of fragmentation of a hydrocarbon-based solid material, notably of a waste material, is performed so as to form the solid material in divided form comprising at least one hydrocarbon-based compound. Such fragmentation is performed by any suitable means. Such a fragmentation means that is suitable for breaking up the hydrocarbon-based solid material and for forming particles of solid material in divided form is chosen. Such a fragmentation means that is suitable for forming particles of solid material in divided form in the form of platelets with a largest dimension of less than 20 mm and with a thickness of the order of 3 mm or less than 3 mm is chosen. Such a step of fragmentation of the hydrocarbon-based solid material makes it possible to form a solid material in divided form which has a particle size suitable for promoting its flow in dispersed form in the inert liquid and its contact with the catalyst for the purposes of the catalytic cracking reaction.

Advantageously and according to the invention, after the fragmentation step, a step of heating the solid material in divided form to a temperature of between 50° C. and 100° C., notably of the order of 80° C., is performed. The heating of the solid material in divided form promotes its subsequent dispersion in the inert liquid, notably in the inert liquid at a temperature of the order of 330° C. obtained from the recycling of the cracking foam.

Advantageously and according to a preferential variant of a process according to the invention, the step of heating in a continuous stream is performed by introducing a stream of solid material in divided form into a screw conveyor, as heating device, comprising an envelope suitable to be able to be brought to the heating temperature and to heat the solid material in divided form.

Advantageously and according to a preferential variant of a process according to the invention, after the heating step, a hot stream of the solid material in divided form is collected at the outlet of the heating device, notably of the conveyor, and the hot stream of said solid material in divided form is directed into a bath of hot inert liquid, notably of liquid which is inert at a temperature of between 300° C. and 330° C. derived from the recycling of the cracking foam. The temperature of this dispersion of the solid material in divided form in the inert liquid is maintained at a temperature below the cracking temperature.

Advantageously and according to the invention, a step of drying the solid material in divided form is performed, during which a dispersion of the solid material in divided form in inert liquid, notably recycled inert liquid, is maintained at a temperature above 100° C., notably at a temperature of between 100° C. and 280° C., so as to form a dispersion of a solid material, named dry material, which is in divided form comprising at least one hydrocarbon-based compound, said dry material having a moisture content of less than 10%, notably between 8% and 10%, in the inert liquid.

Advantageously and according to the invention, a step of deoxygenation of the solid material in divided form is performed, during which a dispersion of the solid material in divided form in the liquid which is inert at the cracking temperature is kept in contact with a gaseous atmosphere with an oxygen partial pressure value less than the partial pressure of oxygen of atmospheric air so as to form a deoxygenated dispersion of the solid material in divided form in the inert liquid.

This deoxygenation step is adapted to reduce the amount of molecular oxygen ($O_2$) present in the dispersion of the solid material in divided form in the inert liquid. Such a deoxygenation is performed by keeping the dispersion of the solid material in divided form in the inert liquid in contact with a gaseous atmosphere having an oxygen partial pressure value less than the partial pressure of oxygen of atmospheric air. For example, such a deoxygenation is performed whilst the dispersion of the solid material in divided form in the inert liquid is kept in contact with an atmosphere of an inert gas. There is nothing to prevent such a deoxygenation from being performed whilst the dispersion of the solid material in divided form in the inert liquid is kept in contact with atmospheric air at a pressure below atmospheric pressure.

Advantageously and according to the invention, the deoxygenation step and the step of drying the dispersion of said solid material in divided form in the inert liquid are performed simultaneously and a deoxygenated dispersion of a solid material, named dry material, which is in divided form in the inert liquid is formed, said dry material having a moisture content of less than 10%, notably between 8% and 10%.

Such a step of deoxygenation and drying is suitable for extracting the moisture from the solid material in divided form in the form of water vapour, for condensing the water vapour formed and for collecting this water of condensation by gravity. Thus, the moisture content of the solid material in divided form is lowered to a value of less than 10%, notably between 8% and 10%. The moisture content of the hydrocarbon-based solid material is determined by any appropriate means. The deoxygenation and drying of the dispersion of the solid material in divided form in the inert liquid is accompanied by a reduction in its temperature (due to the endothermic vaporization), the temperature of the deoxygenated dispersion of a dry material in the inert liquid being less than 150° C., notably of the order of 100° C. to 110° C.

Advantageously and according to the invention, such a step of deoxygenation and drying in a continuous stream is performed by subjecting a stream of the dispersion of said solid material in divided form in the inert liquid in a conveyor in which the partial pressure of oxygen is less than the partial pressure of oxygen of atmospheric air. Advantageously and according to the invention, such a step of deoxygenation and drying in a continuous stream is performed by subjecting a stream of the hot dispersion of said solid material in divided form in the inert liquid in a conveyor in which the internal volume is under negative pressure, i.e. the gaseous atmosphere of which is at a pressure below atmospheric pressure.

Such a step of deoxygenation and drying makes it possible to limit to a controlled value the amount of molecular oxygen present in the deoxygenated dispersion. It also makes it possible to limit by controlling it, the exothermic effect of the combustion of dihydrogen ($H_2$) during the subsequent catalytic cracking reaction, by a supply, which is itself controlled, of oxygen into said cracking chamber. It makes it possible to minimize the uncontrolled exothermic combustion reaction of dihydrogen which is liable to lead:
  to the random formation of water vapour and to an uncontrolled increase in the temperature of the vapours evolved during the cracking reaction, such an increase in the temperature of the vapours being of a nature to oppose the condensation of the energy products, notably of fuel; and
  to an uncontrolled increase in the temperature of said cracking dispersion in said cracking chamber, notably up to a temperature of the order of 600° C. (observed when the deoxygenation step is not performed), this temperature being incompatible with the running of a cracking reaction without coke formation.

Advantageously, in one embodiment of a process according to the invention, said cracking dispersion is formed by placing in contact and mixing:
  an amount of the deoxygenated dispersion of said dry material in the inert liquid;
  an amount of at least one catalyst;
  an amount of at least one alkaline compound, notably of lime; and
  an amount of the inert liquid;
so as to form said cracking dispersion at a temperature below said cracking temperature, and in which at least one catalyst is in contact with at least one, notably with each, hydrocarbon-based compound of the solid material in divided form.

The mixing of predetermined amounts of said deoxygenated dispersion, of at least one catalyst, of at least one alkaline compound, notably of lime, and of inert liquid is performed. This mixing step is performed via any suitable means.

In particular, advantageously, in a preferential embodiment of a process according to the invention, such a mixing step is performed in a continuous stream in which the following are placed in contact and mixed:
  a stream of the deoxygenated dispersion of said dry material in the inert liquid;
  at least one, notably a stream of at least one, catalytic cracking catalyst; and
  at least one, notably a stream of at least one, alkaline compound; and
  a stream of inert liquid;
so as to form a stream of said cracking dispersion having a temperature below said cracking temperature, and in which at least one catalyst is in contact with at least one hydrocarbon-based compound of the solid material in divided form.

There is nothing to prevent an additional step of adjusting the particle size of said cracking dispersion from being performed, after this mixing. Such an adjustment of the particle size is performed via any suitable fragmentation means.

Advantageously, in certain preferential embodiments of a process according to the invention, a step of heating the stream of said cracking dispersion to a temperature below the cracking temperature of each hydrocarbon-based compound of the solid material in divided form is then performed. Under these conditions, the coke formation temperature is not reached in said cracking dispersion. This heating step may be performed via any suitable heating means, with the exclusion of any heating means having a wall for heat exchange by contact with said cracking dispersion and heated to a temperature greater than or equal to the coke formation temperature, i.e. greater than or equal to 360° C., notably greater than 400° C. However, there is nothing to prevent said cracking dispersion from being heated with heating means which have a wall for heat exchange by contact provided that this heat exchange wall is not brought to a temperature of greater than or equal to 360° C. Such a step of heating said cracking dispersion advantageously makes it possible to raise its temperature up to a temperature as close as possible to but nevertheless below the cracking temperature of each hydrocarbon-based compound of the solid material in divided form.

Advantageously, in this preferential embodiment of a process according to the invention, a stream of inert liquid, free of hydrocarbon-based solid material, of catalyst and of alkaline compound, is heated so that the inert liquid of this stream reaches a temperature above said cracking temperature. The inert liquid is heated to a chosen temperature so that the mixture formed by said cracking dispersion and by the hot inert liquid reaches and exceeds the cracking temperature of at least one, notably of each, hydrocarbon-based compound of the solid material in divided form but nevertheless remains below the coke formation temperature. This heating is performed via any suitable heating means, notably via any means for heat exchange with a source of heat via a heat exchanger.

Advantageously, in this preferential embodiment of a process according to the invention, the following are chosen and adjusted:
  the temperature of the stream of inert liquid,
  the temperature of the stream of said cracking dispersion,
  a flow rate of the stream of inert liquid, and a flow rate of the stream of said cracking dispersion;
so that the temperature of the mixture of said cracking dispersion and of the inert liquid reaches a temperature at least equal to the cracking temperature of at least one, notably of each, hydrocarbon-based compound of the solid material in divided form and below the coke formation temperature. A stream of the mixture in which the catalytic cracking reaction takes place at a temperature below the dioxin formation temperature and below the furan formation temperature is thus formed.

However, there is nothing to prevent a mixture of a predetermined amount of said cracking dispersion and of a predetermined amount of inert liquid at a temperature above the cracking temperature of at least one, notably of each, hydrocarbon-based compound of the solid material in divided form from being prepared. A cracking dispersion at a temperature at least equal to the cracking temperature of at least one, notably of each, hydrocarbon-based compound of the solid material in divided form and in which the catalytic cracking reaction takes place is thus formed.

Advantageously and according to the invention, said cracking temperature is between 240° C. and 340° C., notably between 280° C. and 340° C. Said cracking temperature of said cracking dispersion depends on the chemical composition and/or the origin of the hydrocarbon-based solid material, notably of the waste material. The heating of said cracking dispersion is adapted by mixing with hot inert liquid so that the temperature of said cracking dispersion is at least equal to the cracking temperature of at least one, notably of each, hydrocarbon-based compound of the solid material in divided form and below the coke formation temperature.

Advantageously, in certain embodiments of a process according to the invention, mixing is performed, notably in a continuous stream:
  of the inert liquid brought to a temperature above the cracking temperature of at least one, notably of each, hydrocarbon-based compound of the solid material in divided form, and
  of said cracking dispersion brought to a temperature below the cracking temperature of each hydrocarbon-based compound of the solid material in divided form;
at atmospheric pressure or at a pressure below atmospheric pressure or at a pressure above atmospheric pressure. A pressure below atmospheric pressure is particularly suitable for avoiding leakage of short-chain hydrocarbons out of the device.

Gradually as they appear, the compounds in gaseous form (fuel, carbon dioxide, water vapour) form with the inert liquid a foam (oil/gas) in expansion with the development of the cracking reaction.

Advantageously and according to the invention, since said cracking dispersion brought to a temperature at least equal to said cracking temperature forms a foam, named cracking foam, due to a formation of a gaseous phase (notably comprising short-chain hydrocarbons, carbon dioxide, water vapour, etc.) during the cracking reaction, said cracking foam is subjected to a centrifugation step via which separation of a gaseous phase (notably comprising short-chain hydrocarbons, carbon dioxide, water vapour, etc.) and of a solid/liquid mixed composition formed from a dispersion of solid matter obtained from the cracking in the inert liquid, i.e. of solid matter initially present in the cracking dispersion (containing catalyst and, where appropriate, solid material in divided form) and/or solid matter formed during the catalytic cracking, is performed.

Advantageously, in certain embodiments of a process according to the invention, since a stream of said cracking dispersion brought to a temperature at least equal to said cracking temperature forms a stream of a foam, named cracking foam, due to the cracking reaction, the stream of said cracking foam is subjected to a centrifugation step via which separation of a stream of a gaseous phase (notably comprising short-chain hydrocarbons, carbon dioxide, water vapour, etc.) and of a stream of a solid/liquid mixed composition formed from a dispersion in the inert liquid of solid matter obtained from the catalytic cracking is performed.

Such a centrifugation step is also suitable for forming turbulence in said cracking foam and for separation of a gaseous phase. Such turbulence promotes redistribution of the catalyst(s) and of the solid material in divided form and the continuation of the cracking reaction in said cracking foam and in the solid/liquid mixed composition due to the shifting of the equilibrium of the cracking reaction during the release of the released gaseous products. Such a centrifugation step makes it possible to increase the reaction yield and to reduce the amount of solid material in divided form in the bath of inert liquid.

For example, the centrifugation step is performed by subjecting said cracking foam, notably said foam of the stream of said cracking foam, to a centrifugation via which said cracking foam is sprayed through the lattice of a grate, leading to fragmentation of said cracking foam into particles promoting the release of the compounds in the gaseous phase.

Advantageously and according to the invention, condensation of the gaseous phase is performed under conditions suitable for fractionating the gaseous phase and for forming the energy products, notably the fuel. This condensation is performed, for example, by means of a fractional distillation device in which the components of the vapour phase, notably the water vapour and the fuel, are separated.

Advantageously and according to the invention, the solid/liquid mixed composition, notably the solid/liquid mixed composition of a stream of solid/liquid mixed composition, obtained from the centrifugation step is subjected to a liquid/solid separation step in which inert liquid substantially free of solid matter is formed, and the inert liquid is then recycled. The solid/liquid mixed composition is subjected to a step of liquid/solid separation of solid matter and of inert liquid substantially free of solid matter (and thus free of hydrocarbon-based compound, of solid material in divided form and of catalyst) and the inert liquid is recycled.

Advantageously, a stream of the solid/liquid mixed composition is subjected to a step of liquid/solid separation of solid matter and of a stream of inert liquid and the inert liquid of the stream of inert liquid is recycled.

Advantageously, the liquid/solid separation step is performed by decantation of the solid matter. Advantageously, this liquid/solid separation step is performed by guiding a stream at a low flow rate, for example of the order of 5 mm per second, of the solid/liquid mixed composition in a substantially vertical and descending direction so that the stream of the solid/liquid mixed composition leads, given the difference in densities of the inert liquid and of the solid matter, to decantation of the solid matter of the solid/liquid mixed composition and by reorienting the stream of inert liquid resulting from this decantation in a substantially vertical and ascending direction so that the solid matter and the inert liquid of the solid/liquid mixed composition are separated. A stream of inert liquid, named regenerated inert liquid, which is substantially free of solid matter is thus formed. A stream of said regenerated inert liquid is formed at a temperature below the cracking temperature, notably between 220° C. and 320° C.

In one process according to the invention, advantageously, said regenerated inert liquid is recycled. In one process according to the invention, said regenerated inert liquid is recycled into any step of the process in which inert liquid is required. It is possible to recycle at least a portion of said regenerated inert liquid to form the dispersion of said dry material in the inert liquid, to form said cracking dispersion from the deoxygenated dispersion of said dry material in the inert liquid, or else to form said cracking dispersion at the cracking temperature. Advantageously, said regenerated inert liquid is recycled from a stream of said regenerated inert liquid into any step of the process in which a stream of inert liquid is required.

Advantageously and according to the invention, during the liquid/solid separation step, the solid matter containing catalyst is collected. Advantageously, extraction of the catalyst is performed in order to recycle it and to reuse it in a catalytic cracking process according to the invention.

In certain advantageous embodiments of a process according to the invention, a circulation of inert liquid is formed between:
 a zone (a) for mixing:
  a stream of inert liquid;
  a stream of said deoxygenated dispersion;
  a stream of at least one catalyst; and
  a stream of at least one alkaline compound;
and for formation of a stream of said cracking dispersion at a temperature below the cracking temperature of each hydrocarbon-based compound of the solid material in divided form;
 a zone (b) for heating a stream of inert liquid to a temperature above the cracking temperature;
 a zone (c) for heating a stream of said cracking dispersion to a temperature below the cracking temperature of each hydrocarbon-based compound of the solid material in divided form;
 a zone (d) for mixing:
  a stream of said cracking dispersion heated to a temperature below the cracking temperature of each hydrocarbon-based compound of the solid material in divided form; and
  a stream of inert liquid at a temperature above the cracking temperature of at least one, notably of each, hydrocarbon-based compound of the solid material in divided form;
and for catalytic cracking of at least one, notably of each, hydrocarbon-based compound of the solid material in divided form;
 a zone (e) for centrifuging said cracking dispersion in foam form and for generating a stream of a solid/liquid mixed composition;
 a zone (f) for solid/liquid separation of solid matter and of the inert liquid, the inert liquid being recycled into the mixing zone (a).

In these advantageous embodiments of a process according to the invention, a stream of said cracking dispersion is formed (by mixing of a stream of said cracking dispersion at a temperature below the cracking temperature of each hydrocarbon-based compound and of a stream of inert liquid at a temperature above the cracking temperature of at least one, notably of each, hydrocarbon-based compound) continuously at a temperature at least equal to the cracking temperature of at least one, notably of each, hydrocarbon-based compound and below the coke formation temperature, the hydrocarbon vapours formed due to the catalytic cracking are continuously condensed, and a stream of regenerated inert liquid (and, where appropriate, the catalyst) is recycled so as to continuously form a stream of said cracking dispersion at a temperature below the cracking temperature of each hydrocarbon-based compound.

Such a process for continuously producing energy products, notably fuel, makes it possible:
 to keep the solid material in divided form, at least one catalyst and at least one alkaline compound in contact in the inert liquid;
 to form a stream of said cracking dispersion at a temperature below the cracking temperature and at a controllable flow rate; and
 to form a stream of inert liquid at a temperature above the cracking temperature and at a controllable flow rate, notably of regenerated inert liquid.

The invention also relates to a process for producing energy products, notably fuel, by catalytic cracking of a solid hydrocarbon-based material, notably of a waste material, in which deoxygenation of a solid material in divided form containing at least one hydrocarbon-based compound is performed. This deoxygenation is performed by keeping the solid material in divided form in contact with a gaseous atmosphere having an oxygen partial pressure value less than the partial pressure of oxygen of atmospheric air.

Advantageously and according to the invention, the operations for forming said cracking dispersion, the catalytic cracking reaction, the step of separating a gaseous phase and a solid/liquid mixed composition, notably by centrifugation, and the step of liquid/solid separation of the solid/liquid mixed composition are performed in the same thermally insulated tank, which is suitable for containing a bath of inert liquid.

According to certain advantageous embodiments of a process according to the invention for producing energy products, notably fuel, by catalytic cracking of a solid material, notably a waste material, in divided form containing biomass, i.e. a material consisting at least partly of matter of plant origin and/or of matter of animal origin and/or of matter of origin [sic], an amount of an oxygenated gaseous composition, notably at a pressure above atmospheric pressure, which is capable of bringing about an exothermic reaction with at least a portion of the dihydrogen ($H_2$) in gaseous form produced during the cracking, is supplied to said cracking dispersion at said cracking temperature. Such a supply makes it possible, entirely unexpectedly, to be able to maintain the temperature of the cracking chamber at said cracking temperature by compensating for the heat of vaporization of the compounds formed during the cracking and by maintaining the temperature of said cracking foam and of the gaseous compounds at a temperature, notably of the order of 340° C., allowing their vaporization and their distillation, without production of coke.

The inventors have observed that, contrary to the indications of US 2009/267349, which recommends performing the cracking reaction under an atmosphere substantially free of oxygen, it is possible to control the exothermic oxidation reaction of dihydrogen ($H_2$) in gaseous form by at least one controlled supply of an oxygenated gaseous composition directly in contact with dihydrogen produced in said cracking chamber. Such a controlled supply contributes, firstly, in the initial phase (during the mixing of said cracking dispersion and of hot inert liquid) of the cracking reaction (i.e. in the bottom part of the cracking chamber), to production of thermal energy making it possible to raise the temperature of said cracking dispersion such that it contributes, if need be, towards reaching the cracking temperature of at least one hydrocarbon-based compound of the hydrocarbon-based solid material without having recourse to an exchanger comprising an exchange surface at a temperature greater than or equal to the coke formation temperature. It contributes mainly, secondly, in the terminal phase of the cracking reaction (i.e. in the top part of the cracking chamber) to a production of thermal energy making it possible to promote the maintenance in gaseous form of the hydrocarbons formed during the cracking reaction by at least partial compensation, or even excess compensation, for the heat (endothermic) of vaporization of the hydrocarbons formed. Such a supply of oxygenated gaseous composition makes it possible to raise and/or to keep the temperature of the cracking foam in the top part of the cracking chamber at a value of the order of 330° C. to 340° C. required to maintain in gaseous form the hydrocarbons formed, notably the hydrocarbons bearing a hydrocarbon-based chain having a number of carbon atoms of less than or equal to 18 ($C_{18}$).

According to certain embodiments, such a supply takes place in the initial phase of the cracking reaction so as to generate an endogenous production of thermal energy making it possible to raise the temperature of said cracking dispersion so that it reaches the cracking temperature of at least one hydrocarbon-based compound of the hydrocarbon-based solid material.

According to certain embodiments, such a supply takes place in the terminal phase of the cracking reaction so as to generate an endogenous production of thermal energy making it possible to promote the maintenance in gaseous form of the hydrocarbons formed during the cracking reaction by compensating for the heat of vaporization of the hydrocarbons formed.

According to certain advantageous embodiments according to the invention:
- a hydrocarbon-based solid material in divided form is heated to a temperature of the order of 80° C., and then
- this hydrocarbon-based solid material in divided form is placed in contact with a stream of recycled inert liquid at a temperature of the order of 330° C. so as to form a dispersion of solid material in divided form in the inert liquid, and then
- this dispersion is deoxygenated and dried, whereby the temperature of this dispersion is lowered to a value of the order of 100° C., and then
- said cracking dispersion is prepared, and then
- said cracking dispersion is heated to a temperature of the order of 260° C. on contact with a heat exchanger, the temperature of which does not exceed 340° C., and then
- mixing of said cracking dispersion with inert liquid brought to a temperature of the order of 340° C. is performed so that the temperature of said cracking dispersion reaches 280° C. and the cracking reaction is initiated, and then
- the cracking temperature is maintained by at least one introduction of oxygenated gaseous composition which is reactive with dihydrogen formed during the cracking and which compensates for the heat of vaporization of the hydrocarbons formed during the cracking so that the temperature reaches about 340° C. allowing the continuation of the cracking and the vaporization of the hydrocarbons formed without coke formation.

The invention also relates to a device for producing energy products, notably fuel, by catalytic cracking of a hydrocarbon-based solid material, notably a waste material. The invention relates in particular to such a device for performing a process for producing energy products, notably fuel, according to the invention.

The invention thus relates to a device for producing energy products, notably fuel, by catalytic cracking of a hydrocarbon-based solid material, notably waste material, comprising:
- a chamber, named cracking chamber, configured to allow mixing of a stream of a liquid which is inert with respect to catalytic cracking and of a stream of a dispersion, named cracking dispersion, comprising:
  - a solid material in divided form containing at least one hydrocarbon-based compound;
  - at least one catalyst, notably a solid catalyst in divided form, for catalytic cracking; and
  - at least one alkaline compound;
  dispersed in liquid which is inert with respect to catalytic cracking; said cracking chamber having:
  - a first inlet for the stream of said cracking dispersion at a temperature below the catalytic cracking temperature of each hydrocarbon-based compound of the solid material in divided form;
  - a second inlet for the stream of inert liquid at a temperature above the catalytic cracking temperature of at least one, notably of each, hydrocarbon-based compound of the solid material in divided form;
  - means for mixing the stream of said cracking dispersion and of the stream of inert liquid in said cracking chamber; and
  - at least one aperture for the escape of said cracking dispersion in the form of a foam, named cracking foam, comprising hydrocarbons formed by catalytic cracking;
  - first means for heating the stream of said cracking dispersion to a temperature below the cracking temperature;
  - second means for heating the stream of inert liquid to a temperature above the catalytic cracking temperature of at least one, notably of each, hydrocarbon-based compound of the solid material in divided form.

Advantageously, a device according to the invention comprises first heating means and control means for adjusting the temperature of said cracking dispersion by the first heating means.

Advantageously, a device according to the invention comprises second heating means and control means for adjusting the temperature of the stream of inert liquid by the second heating means.

Advantageously, the first heating means are distinct from the second heating means.

Advantageously and according to the invention, the device comprises means for pumping said cracking dispersion and for forming the stream of said cracking dispersion. Such means for pumping said cracking dispersion are suitable to allow withdrawal of a stream of inert liquid upstream of the pumping means, and mixing of said stream with a stream of at least one catalyst, a stream of at least one alkaline compound and a stream of said deoxygenated dispersion so as to continuously form the stream of said cracking dispersion. Such means for pumping said cracking dispersion are suitable to allow, downstream of the pumping means, the formation of a stream of said cracking dispersion towards first heating means.

Advantageously and according to the invention, the device also comprises means for pumping inert liquid and for forming a stream of inert liquid. Such means for pumping inert liquid are suitable to allow, upstream of the means for pumping inert liquid, withdrawal of a stream of inert liquid, notably a stream of regenerated inert liquid, for the purpose of heating it to a temperature above the cracking temperature. Such liquid pumping means are suitable to allow, downstream of the pumping means, the formation of a stream of inert liquid intended for the cracking reaction via the second heating means.

These pumping means (for pumping said cracking dispersion and the inert liquid) make it possible to regulate the respective flow rates of the stream of said cracking dispersion and of the stream of inert liquid as a function of the temperature of said cracking dispersion and of the temperature of the inert liquid. The device according to the invention makes it possible to raise the temperature of said cracking dispersion to a temperature value that is sufficient to allow catalytic cracking of at least one, notably of each, hydrocarbon-based compound of the solid material in divided form. The cracking reaction of at least one, notably of each, hydrocarbon-based compound of the solid material in divided form leads to the formation in said cracking dispersion of short-chain hydrocarbons in gaseous form and to the formation of a foam which escapes from said cracking chamber. The expansion of the foam out of said cracking chamber in combination with the stream of said cracking dispersion, with the stream of the inert liquid and with the means for mixing the stream of said cracking dispersion and the stream of inert liquid lead to the formation of a stream of foam which escapes via an emerging upper aperture forming the exit of said cracking chamber.

Advantageously and according to a preferential embodiment of the invention, the device is formed as a single piece and comprises a single thermally insulated tank suitable for containing a bath of inert liquid and containing:
  said cracking chamber;
  at least one device, named mixing pipe, for placing in contact and mixing:
    a stream of a dispersion of the solid material in divided form in inert liquid;
    at least one, notably a stream of at least one, catalyst; and
    at least one, notably a stream of at least one, alkaline compound; and
    a stream of inert liquid formed from the bath of inert liquid; suitable for forming a stream of said cracking dispersion at a temperature below said cracking temperature;
  at least one liquid/solid separation member, notably a member for liquid/solid separation by decantation, of solid matter obtained from the catalytic cracking and of inert liquid;
  a first pump positioned between said mixing pipe and said cracking chamber and suitable for delivering the stream of said cracking dispersion in said cracking chamber via the first heating means;
  a second pump positioned between the solid/liquid separation member and said cracking chamber and suitable for delivering the stream of inert liquid free of solid matter in said cracking chamber via the second heating means.

The single thermally insulated tank makes it possible to maintain substantially the temperature of the inert liquid and of said cracking dispersion circulating in the single thermally insulated tank. It makes it possible to limit the heat losses. It also makes it possible to limit to the amount strictly necessary the supplies of heat by heating the inert liquid and said cracking dispersion and to fully control the temperature of said cracking dispersion during the catalytic cracking.

The device according to the invention comprises in a single tank the elements necessary for:

preparing, heating and conveying the stream of said cracking dispersion in said cracking chamber;
preparing, heating and conveying the stream of inert liquid in said cracking chamber;
forming the mixture of the streams of said cracking dispersion and of the inert liquid and allowing the catalytic cracking reaction without coke formation;
recycling the inert liquid;
collecting the catalyst for the purpose of recycling it; and
condensing the hydrocarbon vapours formed by catalytic cracking and producing the energy product, notably the fuel.

A device according to the invention makes it possible to establish in the single tank a circulation of said cracking dispersion between the member for mixing and forming said cracking dispersion and said cracking chamber and in which the solid material in divided form is kept in suspension in the inert liquid, promoting contact between at least one, notably between each, hydrocarbon-based compound of the solid material in divided form and at least one catalyst.

Advantageously and according to the invention, the device comprises, mounted on at least one aperture of said cracking chamber, a member for centrifugation of a foam, named cracking foam, formed by catalytic cracking of at least one hydrocarbon-based compound of the solid material in divided form, suitable for separating a gaseous phase containing the energy product, notably the fuel, and a solid/liquid mixed composition formed from a dispersion of solid matter obtained from the cracking in the inert liquid. Advantageously, the solid/liquid mixed composition is incorporated into the bath of inert liquid.

The centrifugation member may be a member for centrifugal spraying of the foam through the mesh of a grate. Such spraying of the foam through the grate leads to fragmentation of said cracking foam into particles of reduced size, promoting:
  release of the compounds in the gaseous phase, notably of the carbon dioxide, the water vapour, etc., and in particular the release of short-chain hydrocarbons in the gaseous phase; and
  contact between the catalyst and unconverted particles of solid material in divided form.

Advantageously and according to the invention, the device is equipped with a device for condensing said short-chain hydrocarbons in gaseous form and for converting them into a liquid energy product.

Advantageously and according to the invention, the device comprises means for solid/liquid separation of the inert liquid and of the solid matter (starting solid matter and/or solid matter formed during the catalytic cracking). Advantageously, the separation means are means for solid/liquid separation by decantation. Such means for solid/liquid separation by decantation are configured to allow the establishment of a vertical stream oriented substantially from the top downwards (descending) of inert liquid loaded with solid matter and the establishment of an ascending stream of inert liquid substantially free of solid matter separated out by decantation. A device according to the invention is thus suitable for allowing recycling of the inert liquid and its reuse, notably for the preparation of said cracking dispersion and for the preparation of inert liquid at a temperature above the cracking temperature. A device according to the invention is thus also suitable for allowing decantation of the residual solid matter to the bottom of the single tank and its removal via any known means.

A device according to the invention comprises means for supplying and for maintaining the level of inert liquid in the single tank. It may be means for supplying replacement inert liquid or inert liquid collected after condensation.

Advantageously, a device according to the invention comprises a conveyor, named drying conveyor, with a screw driven in rotation in an outer envelope brought to a temperature suitable to allow the heating of a solid waste material in divided form, evaporation of at least a part of its moisture, at least partial drying thereof and the formation of said dry material. Said drying conveyor has means, notably a column, for guiding and removing the water vapour formed from the solid waste material in divided form.

Advantageously, a device according to the invention also comprises a screw conveyor with a substantially vertical rotational axis for conveying said dry material from the outlet end of the drying conveyor and emerging into a bath of liquid in which said dry material is placed in contact with the inert liquid and forms a stream of a dispersion of said dry material in the inert liquid, avoiding any obstruction and any blocking of the conveyor.

Advantageously, according to a preferential embodiment, the device according to the invention comprises a press for compressing household refuse at a pressure at least equal to 750 bar and for extruding the hydrocarbon-based solid material, notably waste material. Advantageously, the hydrocarbon-based solid material, notably waste material, has a moisture content of less than 10%, notably between 8% and 10%. According to this preferential embodiment, the device according to the invention comprises an extrusion press, notably an extrusion press as described in EP 0 563 173.

According to certain advantageous embodiments, the device according to the invention comprises at least one device for introducing an oxygenated gaseous composition, notably an oxygenated gaseous composition at a pressure above atmospheric pressure, into said cracking chamber. Such an introduction device may comprise a plurality of injectors of oxygenated gaseous composition under pressure into said cracking chamber.

The invention also relates to a device for producing energy products, notably fuel, by catalytic cracking of a hydrocarbon-based solid material, notably of a waste material, comprising a single tank a) for forming and circulating a stream of a dispersion, named cracking dispersion, comprising a hydrocarbon-based material in divided form, at least one catalyst and at least one alkaline compound, b) for catalytic cracking of said cracking dispersion and c) for recycling a stream of liquid which is inert with respect to the catalytic cracking.

The invention also relates to a process for producing energy products, notably fuel, and a device for performing this process, characterized, in combination or otherwise, by all or some of the characteristics mentioned hereinabove or hereinbelow. Irrespective of the formal presentation that is given thereof, unless explicitly indicated otherwise, the various characteristics mentioned hereinabove or hereinbelow should not be considered as being strictly or inextricably linked together, the invention being able to concern only one of these structural or functional characteristics, or only a portion of these structural or functional characteristics, or only a portion of one of these structural or functional characteristics, or else any group, combination or juxtaposition of all or a portion of these structural or functional characteristics.

BRIEF DESCRIPTION OF THE DRAWINGS

Other aims, characteristics and advantages of the invention will emerge on reading the following description, given without any implied limitation, of some of the possible embodiments thereof, and which refers to the examples given purely for illustrative purposes and without any implied limitation of the invention and to the attached figures in which:

FIG. 4 is a schematic representation of a second particular variant of a device according to the invention;

In FIGS. 3 to 6, the scales and the proportions are not necessarily strictly adhered to, for the sake of clarity of the illustration. The terms "lower", "upper", "top" and "bottom" are understood relative to the device in the operating state, i.e. in which a bath of inert liquid partially fills the tank in the bottom part of the device and the member for collecting the vapours formed during the cracking extends in the upper part of the device.

DETAILED DESCRIPTION

Figure 1:
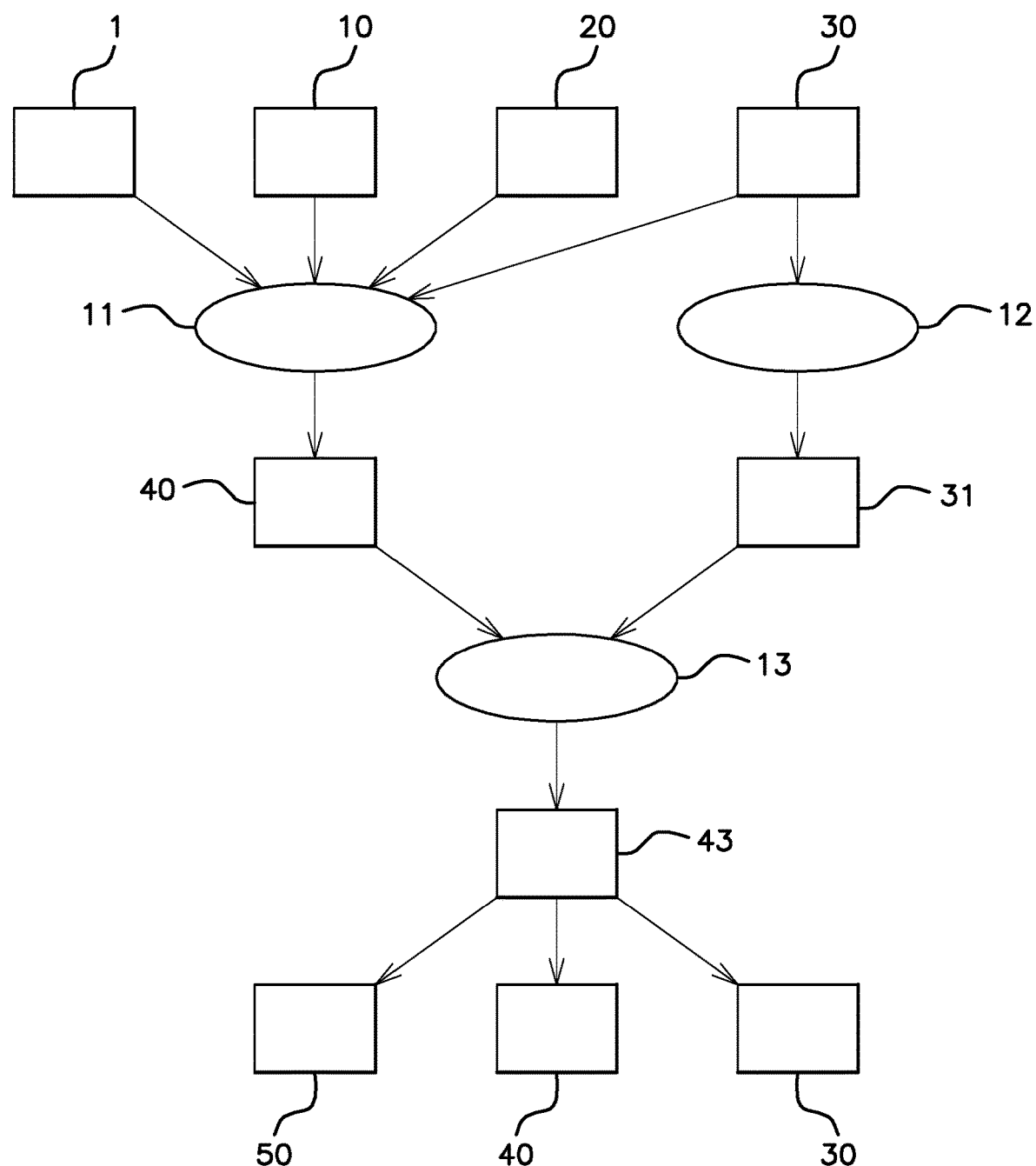
FIG. 1 is an overview diagram of a process according to the invention.

An overview diagram of a process for producing fuel by catalytic cracking of a hydrocarbon-based solid material according to the invention is represented in FIG. 1. In such a process, a dispersion, named cracking dispersion 40, is prepared by mixing 11 an amount of solid material 1, notably a waste material, in divided form containing at least one hydrocarbon-based compound, an amount of at least one catalyst 10, an amount of at least one alkaline compound 20, notably of lime, and an amount of liquid 30 which is inert with respect to the catalytic cracking, i.e. an inert liquid 30 which does not undergo any chemical modification when it is placed under conditions (catalyst, temperature, etc.) for transformation of hydrocarbon-based compounds of the solid material in divided form into short-chain hydrocarbons. Such mixing 11 is performed under conditions chosen to allow dispersion of the solid material 1 in divided form, the catalyst 10 and the alkaline compound 20 in the inert liquid 30 and contact of the hydrocarbon-based compounds of the solid material 1 in divided form and of the catalyst 10. In particular, the solid material 1 in divided form is heated, notably to a temperature of between 50° C. and 100° C., for example of the order of 80° C. Such heating facilitates the dispersion of the solid material 1 in divided form in the inert liquid 30. Said cracking dispersion 40 is prepared at a temperature below the cracking temperature of each hydrocarbon-based compound of the hydrocarbon-based solid material and preferably at a temperature as close as possible to this cracking temperature. However, there is nothing to prevent said cracking dispersion 40 or some of the constituent elements of said cracking dispersion 40 from being heated during its production, provided that this heating does not allow raising of the temperature of said cracking dispersion 4 to a temperature above the cracking temperature of at least one hydrocarbon-based compound of the solid material 1 in divided form. Under these conditions, no cracking reaction of a hydrocarbon-based compound of the solid material 1 in divided form and no coke formation reaction takes place during the mixing 11.

In such a process, a step 12 of heating of a portion of the inert liquid 30 is also performed. This heating step 12 is performed by any appropriate heating means that is suitable for increasing the temperature of a portion of the inert liquid 30 up to a temperature above the cracking temperature of at least one, notably of each, hydrocarbon-based compound of the solid material 1 in divided form. A hot inert liquid 31 is formed. This hot inert liquid 31 is free of solid material 1 in divided form, does not undergo any catalytic cracking and does not lead to the formation of coke during the heating step 12.

For the purposes of the cracking, mixing 13 of an amount of said cracking dispersion 40 and of hot inert liquid 31 is performed so that the temperature of the mixture reaches a temperature at least equal to the cracking temperature of at least one, notably of each, hydrocarbon-based compound of the solid material 1 in divided form but nevertheless below the coke formation temperature. The process according to the invention allows the temperature of the mixture to pass from a temperature below but close to the cracking temperature to a temperature at least equal to the cracking temperature of at least one, notably of each, hydrocarbon-based compound, without requiring heating of said cracking dispersion 40 on contact with a surface heated to a temperature at least equal to, notably above, the temperature for formation of coke, dioxins and furans. In a process according to the invention, the core temperature of said cracking dispersion 40 remains below the coke formation temperature during the mixing step 13.

In practice, step 13 is performed, involving the mixing:
- of an amount of said cracking dispersion 40 brought to a temperature below the cracking temperature, i.e. below a temperature between 240° C. and 340° C., notably between 280° C. and 340° C., depending on the chemical composition of the hydrocarbon-based solid material, without recourse to heat exchange by contact with a heating surface of a heating device brought to a temperature above 360° C., notably of the order of 400° C., and excluding any risk of coke formation;
- of an amount of hot inert liquid 31 brought to a temperature such that the temperature of mixing of the amount of said cracking dispersion 40 and of the amount of hot inert liquid 31 reaches the cracking temperature and without the heating of the inert liquid 30 leading to the formation of coke given that the inert liquid 30 is free of solid material in divided form, of hydrocarbon-based compound and of catalyst.

No coke formation follows therefrom.

The mixing of said cracking dispersion 40 and of the hot inert liquid 31 results in the formation of compounds in gaseous form, notably of short-chain hydrocarbons 50 in gaseous form at the cracking temperature, of carbon dioxide and of water vapour, which, when combined with the hot inert liquid 31, lead to the formation of a cracking foam 43 (liquid/gas). Said cracking foam 43 comprises short-chain hydrocarbons 50 in gaseous form formed during the cracking reaction, which are the source of the fuel 50 by condensation, but also of the catalyst 10 and of the inert liquid 30, which remain unchanged during the cracking reaction.

In such a process according to the invention, the formation of the hydrocarbons 50 in the gaseous phase by catalytic cracking is not accompanied by coke formation given that the temperature of said cracking dispersion 40 remains below the coke formation temperature.

Figure 2:
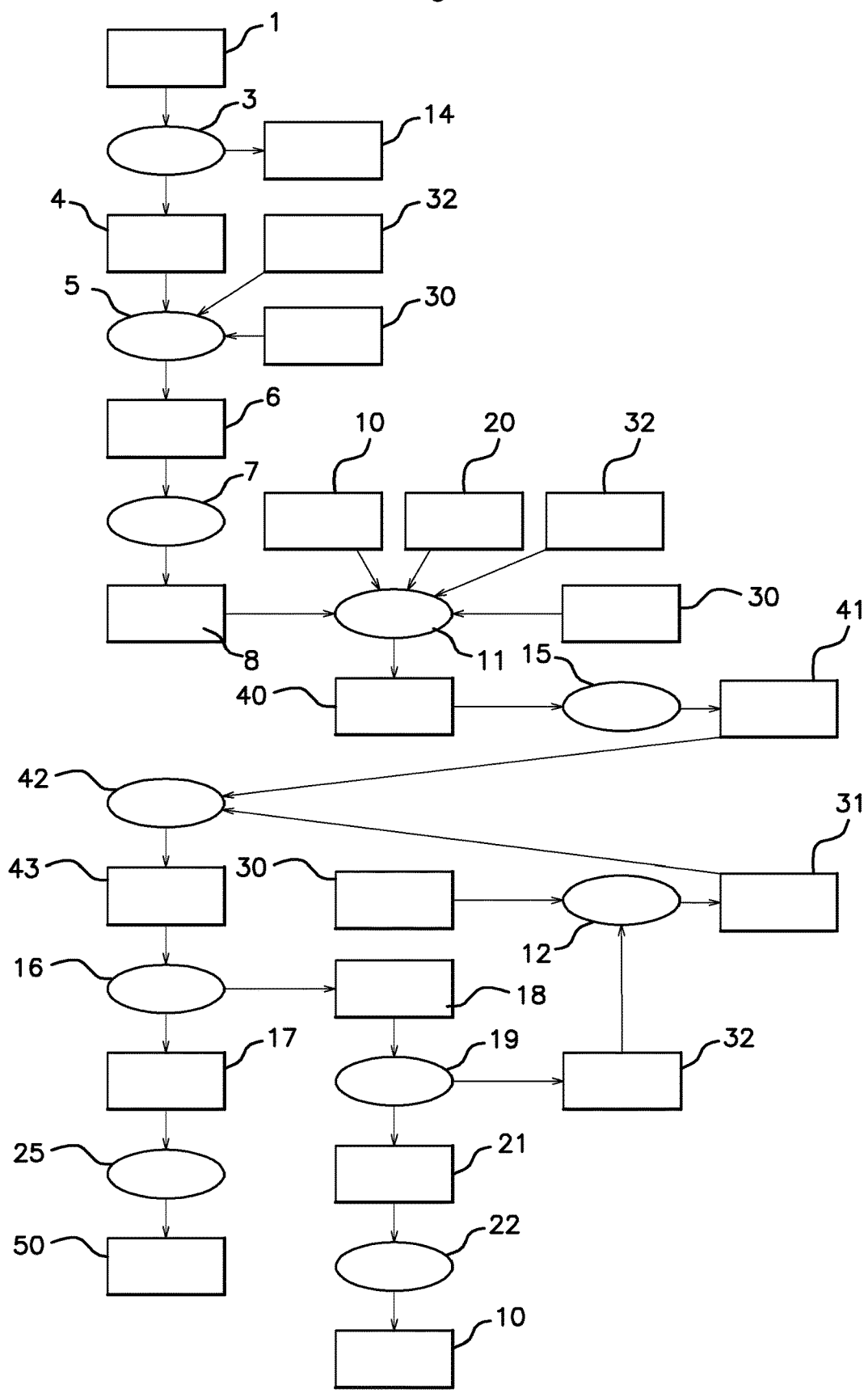
FIG. 2 is an overview diagram of a particular variant of a process according to the invention.

An overview diagram of a particular embodiment of a fuel production process according to the invention is represented in FIG. 2. In this particular embodiment, a solid material in divided form containing at least one hydrocarbon-based compound is selected. It may be a solid waste material 1 in divided form containing at least one hydrocarbon-based compound, notably organic matter, cellulose-based matter and/or synthetic polymer materials. Such a solid waste material 1 in divided form is generally substantially free of putrefiable matter. Such a solid waste material 1 in divided form may be obtained, for example, on conclusion of a process of selective sorting of household waste materials or on conclusion of processing by compression of household refuse in a suitable press to be able to separate the putrefiable matter and the combustible matter from the household refuse. In general, such a solid waste material in divided form may have a moisture content of between 10% and 30%.

In a step not shown in FIG. 2, household refuse is subjected to compression to a pressure of greater than 750 bar under conditions suitable for extracting a fermentable fraction in the form of a wet pulp and for forming the hydrocarbon-based solid material, notably the waste material. It is possible and advantageous to perform such a compression by means of an extrusion press, notably as described in EP 0 563 173.

In another step not shown in FIG. 2, fragmentation of the hydrocarbon-based solid material, notably of the waste material, is performed so as to form the solid material 1, notably the waste material, in divided form. The solid material 1 in divided form may be obtained via any suitable process for fragmenting a hydrocarbon-based solid material. It may be obtained by subjecting the hydrocarbon-based solid material to an extrusion step in an extruder, for example a single-screw or twin-screw extruder. It may also be obtained by chopping a hydrocarbon-based solid material. On conclusion of this fragmentation step, the solid material 1 in divided form is in the form of solid particles having a largest dimension of less than about 20 mm and at least one dimension of less than or equal to 3 mm. Preferably, the solid material 1 in divided form is in the form of solid particles with a specific surface area of less than or equal to 10 $cm^2$ and a thickness of less than or equal to 3 mm.

In the embodiment shown in FIG. 2, the solid material 1 in divided form is subjected to a step 3 of heating the solid material 1 in divided form. Such heating, to a temperature of between 50° C. and 100° C., for example 80° C., facilitates its subsequent dispersion in the inert liquid 30. It also allows removal of water in vapour form from the solid material 1 in divided form and allows its at least partial drying. In this drying step 3, the solid material 1 in divided form is introduced into an inlet end of a screw conveyor, named heating/drying conveyor, equipped with a peripheral heating jacket. Such a suitable heating/drying conveyor is chosen to be able to heat the solid material 1 in divided form while it is being conveyed. There is nothing to prevent such a heating/drying conveyor from having means for collecting water vapour released during the drying 3 and water vapour condensation 14. In this drying step 3, it is possible to introduce the solid material 1 in divided form continuously into the heating/drying conveyor from a hopper for storing the solid material 1 in divided form and for controlled distribution of the solid material 1 in divided form.

The hot solid material 4 in divided form is then subjected to a step 5 of dispersion in liquid 30 which is inert with respect to the catalytic cracking and/or with inert liquid 30, notably regenerated inert liquid 32. To do this, said hot solid material 4 in divided form is collected at the outlet of the heating/drying conveyor and said hot solid material 4 in divided form is dispersed in inert liquid 30 at a temperature of between 200° C. and 360° C., for example inert liquid 30 taken from the cracking foam and recycled at a temperature slightly below the temperature of the cracking foam, notably at a temperature of the order of 330° C. This dispersion 5 is performed using a device comprising a screw conveyor with a substantially vertical rotational axis for conveying said hot solid material 4 in divided form from the outlet end of the heating screw conveyor to the bath of inert liquid 30 into which dips the outlet end of the vertical screw conveyor. A dispersion, named hot dispersion 6, of the hot solid material 4 in divided form in the inert liquid 30 is thus obtained. Such a vertical screw conveyor makes it possible to bring said hot solid material 4 in divided form into contact with the inert liquid 30 and allows its dispersion 5 in the inert liquid 30. In this way, congestion of the device for supplying said dispersion 6 of said hot solid material 4 in divided form in the fuel production device is prevented.

Following this mixing, said hot dispersion 6 is subjected to a step 7 of deoxygenation and of transfer to a fuel production device. This deoxygenation step 7 is performed via any suitable means, for example by placing said hot dispersion 6 in contact with a gaseous atmosphere at a pressure below atmospheric pressure or by placing said hot dispersion 6 in contact with a gaseous atmosphere having a partial pressure of oxygen less than the partial pressure of oxygen of atmospheric air. This results in extraction of molecular oxygen ($O_2$) from said hot dispersion 6. This deoxygenation step 7 is performed, for example, in a screw conveyor, named deoxygenation conveyor, comprising a bell chamber for placing said hot dispersion 6 in contact with a gaseous composition, notably atmospheric air, at a pressure below atmospheric pressure. Due to the temperature and the negative pressure established in the bell chamber under negative pressure, said deoxygenation conveyor allows extraction of water and drying of said hot dispersion 6. The moisture content of the solid material 4 in divided form is lowered from an initial value of between 10% and 30% to a value of less than 10%, notably between 8% and 10%, preferably of about 8%.

A stream of a deoxygenated dispersion 8 of the solid material 4 in divided form with a reduced moisture content in inert liquid is formed at the outlet of said deoxygenation conveyor.

The stream of the deoxygenated dispersion 8 is introduced into a member for mixing the stream of the deoxygenated dispersion 8, a stream of at least one cracking catalyst 10, a stream of at least one alkaline compound 20 and a stream of inert liquid 30 and/or a stream of regenerated inert liquid 32. The flow rates of the streams of deoxygenated dispersion 8, of cracking catalyst 10, of alkaline compound 20 and of inert liquid 30 are adapted upstream of the inlet of the mixing member and in an appropriate manner to respect their proportions in the mixture.

A dispersion, named cracking dispersion 40, is produced in this mixing member, by mixing 11 the stream of the deoxygenated dispersion 8, the stream of catalyst 10, the stream of alkaline compound 20 and the stream of inert liquid 30, at a temperature below the cracking temperature of each hydrocarbon-based compound of the solid material in divided form. In a particularly advantageous embodiment, the stream of inert liquid 30 and/or the stream of regenerated inert liquid 32 is taken from a bath of inert liquid 30 contained in a tank of the fuel production device. At the outlet of the mixing member, a stream is formed of said cracking dispersion 40 maintained by first means for pumping said cracking dispersion 40 placed downstream of the mixing member and suitable for delivering said cracking dispersion 40 into a pipe for heating said cracking dispersion 40 and then into a chamber, named cracking chamber, for mixing a stream of said cracking dispersion 40 and a stream of hot inert liquid 31. A step 15 of heating said cracking dispersion 40 is performed and a hot cracking dispersion 41 is formed at a temperature below the catalytic cracking temperature of each hydrocarbon-based compound.

A stream is also formed of inert liquid 30 and/or of regenerated inert liquid 32 maintained by second means for pumping and for delivering this stream into said cracking chamber. Heating 12 of this stream of inert liquid 30 and/or of regenerated inert liquid 32 is performed before it is introduced into said cracking chamber. A stream of hot inert liquid 31 at a temperature above the cracking temperature of at least one, notably of each, hydrocarbon-based compound of the solid material in divided form is formed. Since the hot inert liquid 31 is free of any hydrocarbon-based compound of the solid material 1 in divided form and of catalyst it does not undergo any catalytic cracking and does not allow the formation of coke.

A step 42 of mixing the stream of said hot cracking dispersion 41 and of the stream of hot inert liquid 31 is performed in said cracking chamber. The respective temperatures of said hot cracking dispersion 41 and of the hot inert liquid 31 and the flow rates of the stream of said hot cracking dispersion 41 and of the stream of hot inert liquid 31 are adapted so that the temperature of the mixture 43 formed is at least equal to the cracking temperature of at least one, notably of each, hydrocarbon-based compound of the solid material 1 in divided form and below the coke formation temperature. This mixing 42 is performed via any suitable mixing means. The catalytic cracking reaction is initiated in the mixture 43 brought to a temperature at least equal to the cracking temperature of at least one, notably of each, hydrocarbon-based compound of the solid material in divided form, releasing short-chain hydrocarbons, carbon dioxide and water vapour so that the mixture formed takes the form of a foam, named cracking foam 43, developing in said cracking chamber. Under the combined effect of means for mixing and for producing hydrocarbons in gaseous form, water vapour and carbon dioxide, said cracking foam 43 develops in said cracking chamber in the direction and up to an upper aperture emerging from said cracking chamber. Said cracking foam 43 is subjected to a step 16 of centrifugation and of separation of a gaseous phase 17 and of a solid/liquid mixed composition 18 formed from a dispersion of solid matter obtained from the catalytic cracking in inert liquid 30. In a particularly advantageous embodiment, the solid/liquid mixed composition 18 is directed towards the bath of inert liquid 30 contained in the tank of the fuel production device. The inert liquid 30 extending into the fuel production device circulates between the member for mixing and formation of said cracking dispersion 40 and said cracking chamber in which it forms the solid/liquid mixed composition 18. This circulation is maintained by first means for pumping said cracking dispersion 40. The inert liquid stream 30 receiving the solid/liquid mixed composition 18 is directed by means of the first pumping means to the inlet of the mixing member and subjected, before it enters the mixing member, to a step 19 of separation by decantation of solid matter 21 and of a stream of regenerated inert liquid 32. The decanted solid matter 21 is extracted from the fuel production device. Where appropriate, the catalyst 10 undergoes a step of recycling 22 for the purpose of its reuse, and the stream of regenerated inert liquid 32 substantially free of solid matter 21 is recycled during step 5 of mixing said dry material 4 in the inert liquid 30, or during the mixing 11 for the preparation of said cracking dispersion 40, or during step 12 of heating inert liquid 30 and/or regenerated inert liquid 32 for the purpose of initiating the cracking reaction.

In a particularly advantageous embodiment of a process according to the invention represented in FIG. 2, during step 19 of separation by decantation, at least a portion of the inert liquid stream 30 is recycled and a stream of regenerated inert liquid 32 is formed, which is subjected to heating 12 of this stream of regenerated inert liquid 32 at a temperature above the cracking temperature before it is introduced into said cracking chamber. In this particularly advantageous embodiment of a process according to the invention represented in FIG. 2, at least another portion of the stream of inert liquid 30 is recycled and a stream of regenerated inert liquid 32 suitable for mixing with the solid material 4 in divided form is formed.

The gaseous phase 17 obtained from said cracking foam 43 is subjected to a step 25 of condensation of the short-chain hydrocarbon vapours so as to form the fuel 50.

Figure 3:
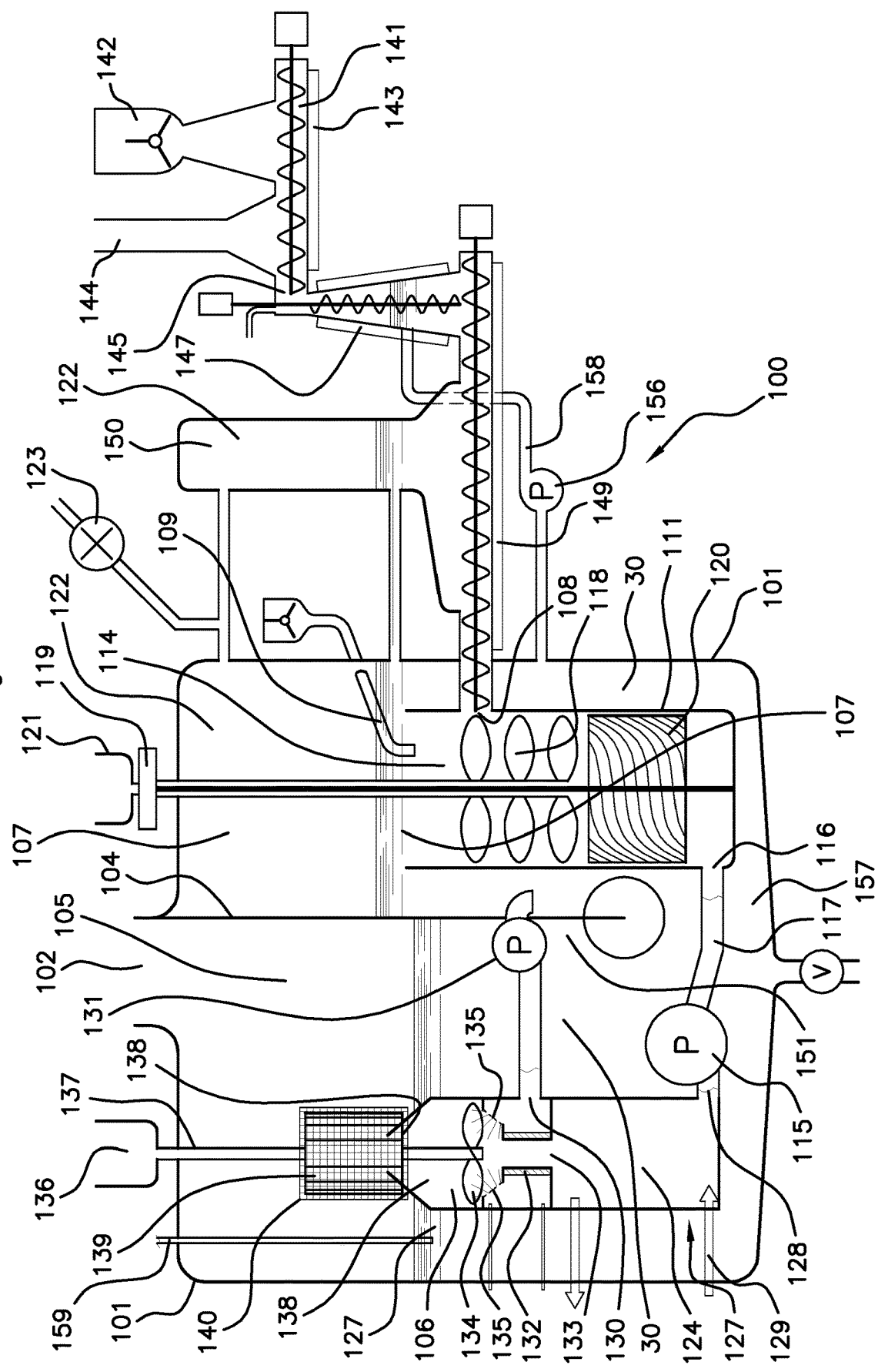
FIG. 3 is a schematic representation of a first particular variant of a device according to the invention.

A first particular variant of a device 100 for producing fuel by catalytic cracking of a hydrocarbon-based solid material according to the invention is represented schematically in FIG. 3.

The fuel production device 100 comprises a tank 101 made of rigid material, which is suitable for receiving a bath of inert liquid 30. The tank 101 is a thermally insulated tank so as to substantially maintain the temperature of the fluids circulating in the tank 101. The tank 101 has a vertical partition 104 for partial separation extending between a first space, named cracking space 105, comprising a cracking chamber 106 and a second space, named mixing space 107, for preparation of a dispersion, named cracking dispersion, comprising a solid material in divided form, at least one cracking catalyst, at least one alkaline compound and inert liquid.

Said cracking space 105 is at atmospheric pressure and has an aperture 102 emerging into the upper part of the tank 101. The aperture 102 of the tank 101 is suitable for receiving a member (not shown in FIG. 3) for collecting the vapours formed during the catalytic cracking reaction and for fractional condensation of these vapours. The collection member may be a column for the fractional distillation and collection of the fuel in liquid form. The vapour collection member is chosen and dimensioned to allow collection of short-chain hydrocarbons and of water and separation thereof.

Said mixing space 107 is suitable for being partially filled with a bath of inert liquid 30 and contains a member 111 for mixing a stream of said cracking dispersion, a stream of catalyst(s) and of alkaline compound. The mixing member 111 is positioned so as to be immersed in the bath of inert liquid 30 and has an upper aperture 114 emerging in the bath of inert liquid 30 so that a stream of inert liquid 30 is introduced into the mixing member 111 via this aperture 114 under the action of first means 115 for pumping said cracking dispersion, which are placed in fluid communication downstream of the mixing member 111 and upstream of said catalytic cracking chamber 106. The first pumping means 115 allow introduction by suction of inert liquid 30 into the mixing member 111 and distribution by delivery of said cracking dispersion to said catalytic cracking chamber 106. The mixing member 111 may be in the form of a cylinder of longitudinal axis positioned vertically in the tank 101 and having, at its upper end, the aperture 114 emerging in the bath of inert liquid 30 and a lower aperture 116 emerging in a pipe 117 for supplying said cracking dispersion to the first pumping means 115.

The mixing member 111 comprises an inlet 108 for a deoxygenated dispersion of said dry material, and an inlet 109 for catalyst and alkaline compound in the mixing member 111. The mixing member 111 comprises means 118 for mixing the deoxygenated dispersion, catalyst(s) and alkaline compound(s) comprising paddles supported by a rotating shaft driven in rotation by a motor 119. The mixing member 111 also comprises additional means 120 for fragmentation of the solid material in divided form. The additional fragmentation means 120 are driven in rotation by a motor 121 coupled to a shaft whose axis is coaxial with the shaft for coupling the motor 119 to the mixing means 118.

Said mixing space 107 is configured to be able to contain in its upper part a volume 122 of gaseous composition at a pressure below atmospheric pressure and extending in contact with the bath of inert liquid 30. Such a volume 122 under negative pressure communicates with a suction device 123 for placing under negative pressure the volume 122 and for deoxygenating the bath of inert liquid 30.

The fuel production device 100 represented schematically in FIG. 3 also comprises means for drying the solid material in divided form comprising a screw conveyor 141 equipped with a hopper 142 for storing and controlled distribution of a stream of solid material in divided form in the drying conveyor 141. The drying conveyor 141 is equipped with a heating jacket 143 suitable for heating and drying the solid material in divided form in the drying conveyor 141. The drying conveyor 141 is also equipped with means 144 for collecting and condensing the water vapour formed during this drying. The drying conveyor 141 makes it possible to form, at the outlet 145 of the drying conveyor 141, a solid material in divided form of reduced moisture content.

The fuel production device 100 represented schematically in FIG. 3 also comprises a device 146 for dispersing said dry material in a bath of inert liquid 30 comprising an endless screw conveyor with a conical envelope, with a substantially vertical rotational axis, and the terminal end 148 of which is arranged to introduce the dispersion of said dry material in contact and in the bath of inert liquid 30. The dispersion device 146 is also equipped with a jacket 147 for heating and maintaining the dispersion of said dry material at the drying temperature.

The conical envelope of the device 146 for dispersing said dry material has an inert liquid inlet in communication with a circuit for supplying the dispersion device 146 with inert liquid from the bath of inert liquid free of solid material in divided form of said mixing space 107. This supply circuit comprises means 156 for pumping inert liquid and pipes 158 for conveying inert liquid making it possible to maintain a substantially constant level of inert liquid in the dispersion device 146.

The fuel production device 100 also comprises a conveyor 149 for deoxygenation and drying of the dispersion of the solid material in divided form in the inert liquid. Such a deoxygenation conveyor 149 is an endless screw conveyor having a heating jacket and equipped with a bell chamber 150 in gaseous fluid communication with a suction device 123 for placing the bell chamber 150 under negative pressure and suitable for placing the inert liquid 30 circulating in the deoxygenation conveyor 149 in contact with a gaseous composition at a pressure below atmospheric pressure. The terminal end of the deoxygenation conveyor 149 emerges in the mixing member 111. Such a deoxygenation conveyor 149 allows at least partial degassing of the dispersion of solid material in divided form in the inert liquid and drying thereof.

Said cracking space 105 is suitable for being partially filled with a bath of inert liquid 30 and contains a cracking pipe or dome 127 of substantially cylindrical form and of longitudinal axis extending vertically into said cracking space 105. The lower part of the cracking dome 127 is positioned to be able to be immersed in the bath of inert liquid 30 and the upper part of the cracking dome 127 is positioned to be able to emerge from the bath of inert liquid 30. The cracking dome 127 has in its lower part an inlet 128 for said cracking dispersion into the dome 127 in fluid communication with the first pumping means 115 so that the first pumping means 115 allow the introduction of a stream of said cracking dispersion in the lower part of the cracking dome 127. The first pumping means 115 are suitable for regulating the stream of said cracking dispersion entering the cracking dome 127 and entering said cracking chamber 106. The cracking dome 127 forms in its lower part a pipe 124 for heating the stream of said cracking dispersion circulating in the cracking dome 127, the heating pipe 124 being equipped with first means 129 for heating the stream of said cracking dispersion so as to form a stream of said cracking dispersion brought to a temperature below the cracking temperature (the cracking temperature being between 240° C. and 340° C., notably between 280° C. and 340° C., depending on the solid material in divided form) of each hydrocarbon-based compound of the solid material at the inlet 133 of said cracking chamber 106.

The cracking dome 127 has in its intermediate part an inlet 130 for a stream of inert liquid into the cracking dome 127, this stream of inert liquid being delivered into the cracking dome 127 by second means 131 for pumping inert liquid 30 taken from the mixing space 107. The second pumping means 131 allow such an introduction of a stream of inert liquid 30 into said cracking chamber 106 via dispersing orifices 135 emerging in said cracking chamber 106.

The second pumping means 131 are suitable for forming, from inert liquid free of solid matter extending into said mixing space 107, a stream of inert liquid 30 and for regulating the stream of inert liquid entering the cracking dome 127. The cracking dome 127 also comprises second means 132 for heating the stream of inert liquid which are suitable for heating the stream of inert liquid delivered into said cracking chamber 106 by the pumping means 131 and for forming a stream of hot inert liquid prior to its mixing with said cracking dispersion. The second heating means 132 are arranged so as to heat the stream of inert liquid and so as not to heat the stream of said cracking dispersion flowing in the heating pipe 124.

Said cracking chamber 106 has means for mixing the stream of said cracking dispersion and the stream of inert liquid, having mixing paddles 134 driven in rotation by a motor 136 coupled to a transmission shaft 137.

The cracking dome 127 has, in its upper part and extending opposite an aperture 138 emerging from said cracking chamber 106, a device 139 for fragmentation of a cracking foam formed by catalytic cracking of said cracking dispersion in said cracking chamber 106, comprising means for centrifugation of the foam and for fragmentation of the foam sprayed by the centrifugation means passing through a fragmentation grate 140.

In a device 100 according to the invention, the fragmentation device 139 produces a solid/liquid mixed composition which falls by gravity into the bath of inert liquid 30 of the cracking space 105. The second means 131 for pumping a stream of inert liquid 30 and/or of regenerated inert liquid in said mixing space 107 and for introducing this stream into the dome 127 of the mixing space 107 and the first pumping means 115, by allowing withdrawal of inert liquid 30 in said mixing space 107 via the mixing member 111 and by delivering said cracking dispersion 40 into said cracking space 105, contribute towards the formation of a circulation and of a regeneration of inert liquid between said cracking space 105 and said mixing space 107 and of a circulation of inert liquid and of solid material in divided form between said mixing space 107 and said cracking space 105. This results in a continuous production of fuel.

In a fuel production device 100 according to the invention, the vertical partition 104 houses in its lower part a communication between said mixing space 107 and said cracking space 105. The vertical partition 104 forming a member 151 for solid/liquid separation of the inert liquid and of solid matter (starting solid matter and/or solid matter formed during the catalytic cracking) allows the establishment and guiding, in said cracking space 105, of a vertical stream (descending, flowing substantially from the top to the bottom of the tank) of inert liquid charged with solid matter obtained from the catalytic cracking and the establishment, in said mixing space 107, of a vertical stream (ascending, flowing substantially from the bottom to the top of the tank) of inert liquid 30 substantially free of solid matter and allowing decantation of solid matter in a decantation zone 157 extending to the bottom of the tank 101 during the reorientation of the stream and the regeneration of inert liquid. The member 151 for solid/liquid separation of the inert liquid and of the solid matter may be a member for solid/liquid separation by decantation of the solid matter, the solid/liquid separation being obtained by entrainment by sedimentation of the solid matter of density higher than the density of the inert liquid and by reorientation of the stream of inert liquid. The device according to the invention allows decantation of the solid matter to the bottom of the tank 101 and its removal via any known means.

A fuel production device 100 according to the invention also comprises an inlet 159 for inert liquid, notably for recycled inert liquid, for the purpose of maintaining the level of inert liquid in the tank 101.

A fuel production device according to the invention is suitable for allowing circulation of a fluid composition comprising an inert liquid in a single thermally insulated tank between:
  a cracking space of the single tank in which at least one hydrocarbon-based compound of a solid material in divided form of the fluid composition is at least partly transformed into fuel by catalytic cracking;
  a space for solid/liquid separation of solid matter (solid material in divided form and/or solid matter formed during the catalytic cracking) and of recycled inert liquid obtained from this separation;
  a space for mixing solid material in divided form containing at least one hydrocarbon-based compound, catalyst, alkaline compound and recycled inert liquid so as to form the liquid composition for the purpose of its catalytic cracking.

A second particular variant of a device 200 for producing fuel by catalytic cracking of a hydrocarbon-based solid material according to the invention is represented schematically in FIG. 4. The device 200 comprises a tank 201 made of rigid material, which is suitable for containing a bath of inert liquid 30. The tank 201 has an outer envelope 251 of a thermally insulating material and makes it possible to limit the heat energy losses from the fluids circulating throughout the tank 201. The tank 201 has a vertical internal partition 204 for partial separation of the cracking space 205 comprising the cracking chamber 206, on the one hand, and the space 207 for mixing and preparing said cracking dispersion, on the other hand.

The cracking space 205 has an upper aperture 225 emerging at atmospheric pressure and suitable for cooperating with a member (not shown in FIG. 4) for collecting the vapours formed during the catalytic cracking reaction and for fractional condensation of these vapours, said cracking space 205 comprising, in the upper part, a gas pocket at atmospheric pressure. The partition 204 makes it possible, when the tank 201 contains inert liquid, to form in the mixing space 207 a gas pocket trapped in a leaktight manner above the inert liquid 30 and which is capable of being placed under negative pressure, i.e. at a pressure below atmospheric pressure, by means of a suction device 223.

The partition 204 forms, in combination with first means 215 for pumping said cracking dispersion in the mixing space 207, for delivering said cracking dispersion into the cracking space 205 and for establishing a circulation of liquid composition comprising inert liquid in the tank 201, a member 281 for solid/liquid separation of the inert liquid and of solid matter (starting solid matter and/or solid matter formed during the catalytic cracking) by decantation.

In the embodiment according to the invention shown in FIG. 4, the tank 201 of the fuel production device 200 comprises a base having a slope for guiding the solid matter decanted in a decantation zone 268 towards a collector 259, notably an endless screw conveyor, for guiding the decanted solid matter towards a removal valve 260.

Said mixing space 207 contains a member 211 for mixing and preparing a cracking dispersion, positioned to be partially immersed in the bath of inert liquid 30 so that the bath of inert liquid 30 exchanges heat with the mixing member 211. The mixing member 211 has an upper aperture 214 emerging from the bath of inert liquid 30 and forming a mouth 264 for receiving a composition comprising catalyst and alkaline compound contained in a reservoir 209.

The mixing member 211 also has an inlet 208 for a dispersion of hydrocarbon-based solid material, notably of dehydrated and deoxygenated hydrocarbon-based solid material, in inert liquid 30 so as to form said cracking dispersion by mixing the dispersion of hydrocarbon-based solid material and the composition of catalyst and alkaline compound. In the operating mode of the device 200 according to the invention, the cracking dispersion inlet 208 extends below the level of inert liquid of the mixing member 211. The inlet 208 of the dispersion of hydrocarbon-based solid material is in fluid communication with a conveyor 241 for conveying the dispersion of hydrocarbon-based solid material in inert liquid towards the inlet 208 of the mixing member 211. The conveyor 241 comprises an endless screw cooperating with a conveyor trough which is open on its upper face and which has on its lower face an outer heating jacket 252 through which runs a stream of hot inert liquid taken from the mixing space 207 and introduced into the outer heating jacket 252 via distribution orifices 257. This stream of hot inert liquid is entrained into the outer heating jacket 252 and in contact along the length of the conveyor by an inert liquid circulation pump 266 and is introduced into the inner volume of the conveyor 241 via apertures 282 for introducing this stream of hot inert liquid (at about 260° C.) into the conveyor 241, positioned substantially at one of the longitudinal ends of the conveyor 241. In this way, the hot inert liquid transmits heat to the conveyor 241 and to the dispersion of hydrocarbon-based solid material circulating in the conveyor 241 and maintains the temperature of the dispersion, and then contributes towards forming the dispersion of hydrocarbon-based solid material by mixing with hydrocarbon-based solid material.

Figure 5:
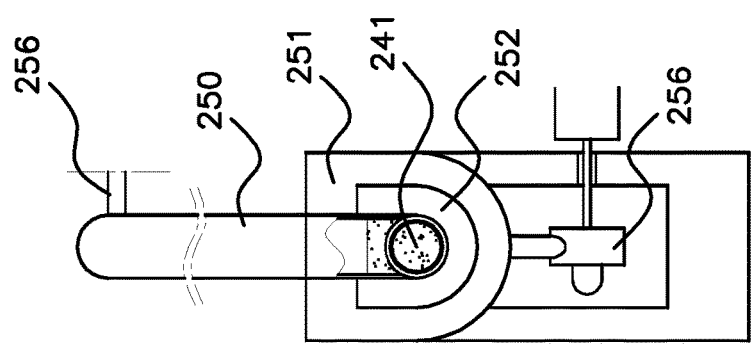
FIG. 5 is a representation in cross section along plane A-A of a detail of the device represented in FIG. 4.

The endless screw of the conveyor 241 is substantially horizontal and extends below the level of inert liquid of the mixing space 207 so that no specific means is necessary for supplying the screw conveyor 241 with inert liquid. The screw conveyor 241 also comprises a bell chamber 250 for degassing, notably for deoxygenating, the dispersion of hydrocarbon-based solid material in the inert liquid maintained at negative pressure, i.e. at a pressure below atmospheric pressure, by means of a suction device 223 communicating with the deoxygenating bell chamber 250 and with the mixing space 207 via pipes 256. Such a degassing, notably deoxygenating, bell chamber 250 allows the formation of a degassed, notably at least partially deoxygenated, and dried dispersion of hydrocarbon-based solid material in the inert liquid. A view in cross section of the conveyor 241 at the level of the degassing bell chamber 250 is shown in FIG. 5.

The fuel production device 200 represented schematically in FIG. 4 also comprises a device 246 for conveying a hydrocarbon-based solid material in divided form into the screw conveyor 241 from a hopper 242 for loading hydrocarbon-based solid material in divided form. The hopper 242 for loading the hydrocarbon-based solid material comprises a member 243 for heating the hydrocarbon-based solid material to a temperature, for example, of between 50° C. and 100° C. (notably 80° C.) and a thermally insulating jacket 253. The loading hopper 242 also comprises means 255 for controlling the stream of hydrocarbon-based solid material introduced into the fuel production device 200. The conveying device 246 may be an endless screw conveyor having a sheath of substantially conical form and an endless screw of substantially vertical rotational axis and the terminal end 248 of which is arranged to be able to supply the screw conveyor 241 with hydrocarbon-based solid material in divided form.

The mixing member 211 of the device 200 according to the invention comprises means 218 for mixing a stream of degassed, notably deoxygenated, dispersion of hydrocarbon-based solid material in the inert liquid and of the composition of catalyst(s) and of alkaline compound(s) forming said cracking dispersion. The mixing means 218 have paddles or knives supported by a shaft 267 driven in rotation by a motor 219. Any other mixing and/or shredding means may be used. The fuel production device 200 comprises first means 215 for pumping said cracking dispersion from the member 211 for mixing and delivering said cracking dispersion to the cracking space 205. Said cracking dispersion is entrained upstream of the first pumping means 215 in a pipe 217 communicating with a lower aperture 216 of the mixing member 211 and downstream of the first pumping means 215 via a pipe 265 emerging in a heating pipe 244 extending in the lower part of the cracking space 205.

The device 200 according to the invention comprises means 229 for primary heating of said cracking dispersion to a temperature below the cracking temperature. In the variant shown in FIG. 4, the primary heating means 229 comprise a heat exchanger 261 suitable for extending into the heating pipe 224 on contact with the stream of said cracking dispersion. The heat exchanger 261 is configured to allow heat exchange between a heat-transfer fluid circulating in the heat exchanger 261 and said cracking dispersion. The heat-transfer fluid circulates in a pipe 262 for circulation of the heat-transfer fluid between an inlet and an outlet of the heat exchanger 261 and a heating unit (not shown in FIG. 4) for the heat-transfer fluid. The circulation pipe 262 comprises an electrovalve 263 for regulating the flow rate of the stream of heat-transfer fluid as a function of the temperature and of the flow rate of the stream of said cracking dispersion circulating in the heating pipe 224. The primary heating means 229 are suitable for heating said cracking dispersion to a temperature (notably a temperature of the order of 240° C. to 280° C.) below the cracking temperature of the solid material, notably of the waste material, in divided form containing at least one hydrocarbon-based compound.

The device 200 according to the invention shown in FIG. 4 comprises secondary inert liquid heating means 232 which are suitable for heating a stream of inert liquid and for placing this stream of hot inert liquid in contact with said cracking dispersion. The secondary inert liquid heating means 232 may be of any nature. They may be a heat exchanger comprising a circuit of heat-transfer fluid brought to a chosen temperature to be able (depending on the respective flow rates of the heat-transfer fluid and of the inert liquid) to raise the temperature of a stream of inert liquid to a temperature that is sufficient (for example of the order of 330° C.) to raise the temperature of said cracking dispersion to a value of the order of 260° C. to 300° C. (notably of the order of 280° C.). The secondary inert liquid heating means 232 are arranged so as not to heat the stream of said cracking dispersion flowing in the heating pipe 224 so that they do not lead to the formation of coke.

The device 200 according to the invention comprises means 231 for pumping a stream of inert liquid free of solid material in divided form and of catalyst in the mixing space 207 and for delivering this stream of inert liquid in contact with the secondary heating means 232 in which the stream of inert liquid is heated and introduced under pressure into the cracking chamber 206. The mixing of the stream of said cracking dispersion and of the stream of hot inert liquid in the cracking chamber 206 allows this mixture to reach substantially the cracking temperature without said cracking dispersion being placed in contact with a wall heated to a temperature capable of leading to the formation of coke.

Figure 6:
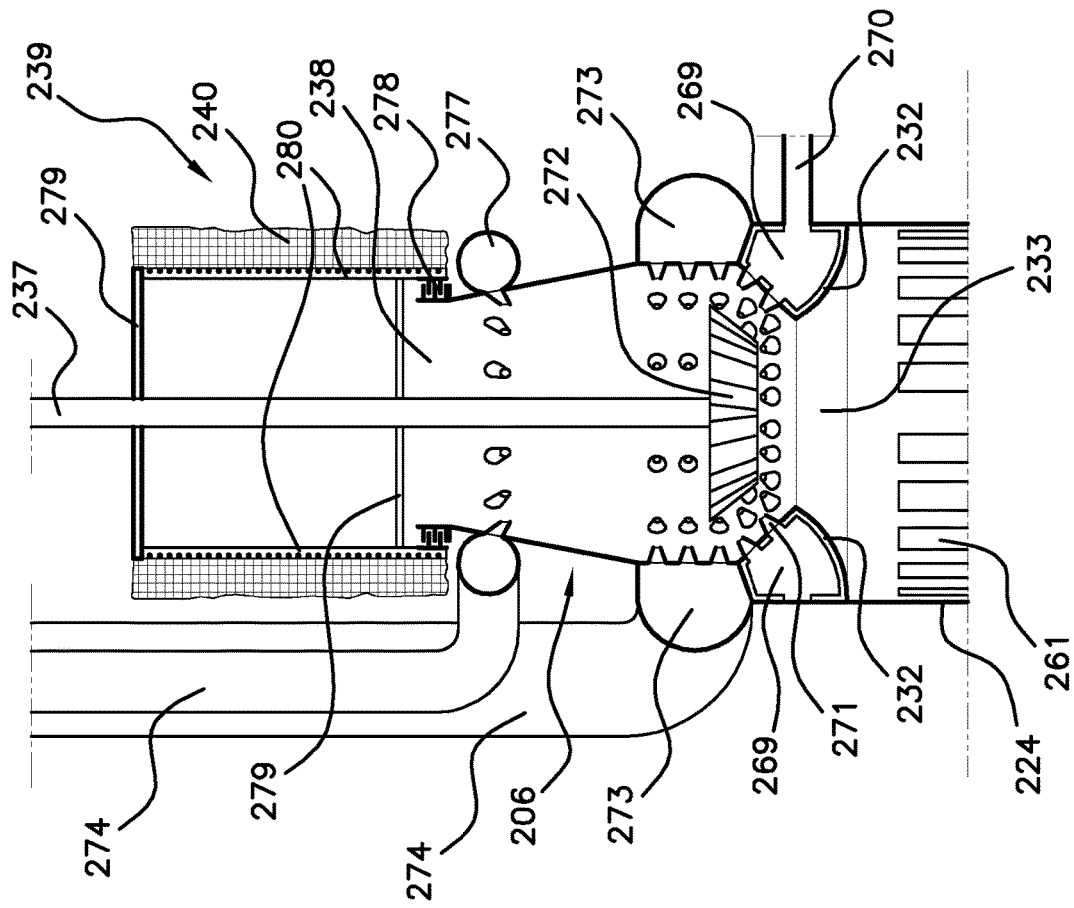
FIG. 6 is a schematic representation of a detail of the second particular variant of a device according to the invention represented in FIG. 4.

The secondary inert liquid heating means 232 are arranged on the inner face of a chamber forming a first peripheral torus 269 for distributing the stream of inert liquid in the cracking chamber 206, a detail of which is shown in FIG. 6. The distributing torus 269 is in communication with the means 231 for pumping the stream of inert liquid via a pipe 270 for conveying inert liquid into the distributing torus 269 and has orifices 271 for injecting hot inert liquid, which emerge in the cracking chamber 206 and in contact with said cracking dispersion, whereby said cracking dispersion virtually reaches the cracking temperature of at least one hydrocarbon-based compound. The cracking reaction results in a production of hydrocarbons in gaseous form, of dihydrogen ($H_2$) in gaseous form, of carbon dioxide and of water vapour in said cracking dispersion leading to the formation of a foam in expansion with the formation of these compounds in gaseous form.

The cracking chamber 206 comprises a turbine 272 for mixing and entraining said cracking dispersion and the foam in expansion in the top part of the cracking chamber. The turbine 272 is mounted securely fixed on a rotating shaft 237 coupled to a drive motor 236 rotating at a speed of the order of 3 revolutions per second.

In a variant shown in FIG. 4 and in FIG. 6, the cracking chamber 206 of the fuel production device 200 comprises a lower peripheral torus 273 for distributing an oxygenated gaseous composition in the cracking chamber 206. The lower peripheral torus 273 is in communication with an oxygenated gaseous composition blower 275 via a pipe 274 for conveying oxygenated gaseous composition into the lower peripheral torus 273 and has holes 276 for injection of oxygenated gaseous composition into the cracking chamber 206. This supply of oxygen results in an exothermic reaction with the dihydrogen in gaseous form produced during the initiation of the catalytic cracking, at least partly compensating for the (endothermic) heat of vaporization of the fuel. The catalytic cracking reaction continues without formation of coke on contact with a hot wall.

In a variant shown in FIG. 4 and in FIG. 6, the cracking chamber 206 of the fuel production device 200 comprises an upper peripheral torus 277 for distributing an oxygenated gaseous composition in the cracking chamber 206. The upper peripheral torus 277 is in communication with the oxygenated gaseous composition blower 275 via a second pipe 274 for conveying oxygenated gaseous composition into the upper peripheral torus 277 which has holes for injection of oxygenated gaseous composition into the cracking chamber 206. This supply of oxygenated gaseous composition, notably of oxygen of this gaseous composition, results in an exothermic reaction with the dihydrogen in gaseous form produced during the continuation of the catalytic cracking, at least partly compensating for the heat of vaporization (endothermic) of the fuel and making it possible to maintain, or even to increase, the temperature in the cracking chamber at a temperature of the order of 330° C. to 340° C. of total vaporization of the alkanes of the fuel. The catalytic cracking reaction continues without formation of coke on contact with a wall brought to a temperature above 360° C.

In the variant of a fuel production device 200 shown in FIG. 4 and in FIG. 6, the rotationally immobile cracking chamber 206 has in its upper part an upper aperture 238 emerging in a rotating device 239 for fragmentation of the cracking foam, driven by the turbine 272. The rotating fragmentation device 239 is mounted securely fixed on a rotating shaft, for example the rotating shaft 237 of the turbine 272 or a rotating shaft which is coaxial with the rotating shaft 237 of the turbine 272, driven in rotation by a drive motor device 236. The rotating fragmentation device 239 and the cracking chamber 206 have complementary bearings 278 for rotationally guiding the rotating fragmentation device 239 relative to the cracking chamber 206. The rotating fragmentation device 239 has radial expansions 279 for fastening and centring the rotating fragmentation device 239 and the rotating shaft 237. These radial expansions 279 may form vanes for entraining the cracking foam from the cracking chamber 206 to the rotating fragmentation device 239. The rotating fragmentation device 239 forms a drum of vertical rotational axis, the cylindrical wall of which is perforated. The cylindrical wall may be formed by a plurality of parallel laths 280 spaced apart from each other, making fragmentation passages for the cracking foam entrained towards the exterior of the drum by the rotation of the rotating device 239. The rotating fragmentation device 239 may also comprise an outer grate 240 having a mesh suitable for allowing fragmentation of the cracking foam sprayed through this mesh. Such a fragmentation of the cracking foam makes it possible to release the gaseous compounds of the cracking foam and allows their subsequent condensation in the collecting member (not shown in FIGS. 4 and 5). The rotating fragmentation device 239 also comprises a plate 279 for closing the upper longitudinal end of the drum, which is securely fixed to the parallel laths 280 and to the rotating shaft 237.

A fuel production device 200 shown in FIG. 4 comprises a device for maintaining the level of inert liquid 30 in the tank 201. Such a device may comprise a pump for supplementing with inert liquid 30 and/or an inlet valve 258 for inert liquid 30 in the tank 201. The fuel production device 200 also comprises means for detecting the level of inert liquid 30 in the tank 201 and for triggering the inlet valve and/or the pump when the level of inert liquid is below a threshold value of this level.

A fuel production device according to the invention is suitable for allowing:
- control of the flow rate of the stream and of the temperature of said cracking dispersion;
- control of the flow rate of the stream and of the temperature of the inert liquid; and
- where appropriate, the flow rate of the stream of oxygenated gaseous composition.

Example 1—Treatment of Household Refuse

Household refuse obtained from an urban collection typically comprises on average about 32% (by mass) of putrefiable matter (i.e. of biomass of animal or plant origin), about 45% (by mass) of combustible matter (including 34% of essentially cellulose-based matter and 11% of synthetic polymeric or composite materials) and about 23% (by mass) of inert matter (glasses, metals, minerals). After removal of the inert matter from this household refuse, this refuse is subjected to a step of compression in a press as described in EP 0 563 173. During this compression, the household refuse separates into a fraction flowing through the dies of the press in the form of an organic pulp containing a mass proportion of 96% to 97% of putrefiable matter and a fraction, named solid household waste material, retained in the press and containing about 70% of cellulose-based matter (notably papers, cardboards and sanitary textiles) and about 30% of synthetic polymeric waste materials. Said solid household waste material also comprises about 3% of incombustible inert matter (glasses, metals, various minerals and the like which passed through the initial sorting) and about 4% of putrefiable organic matter. The relative moisture content of said solid household waste material ranges from a value of about 10% immediately on exiting the press and stabilizers at a value of about 28% after storage, by natural rehumidification by the moisture of the air. Said solid household waste material is, on exiting an extruder or a press as described in EP 0 563 173, in the form of blocks of compact sheets having a density substantially of about 0.85 and is non-flammable as a compact mass. This solid household waste material can be broken into pieces, notably by chopping. A solid waste material in divided form formed from particles having a largest dimension of less than or equal to about 20 mm and at least one smallest dimension of less than 3 mm is formed. In addition, such a solid household waste material comprises only about 3% of inert matter (or refuse, such as gravels, glass and the like) which is incapable of undergoing catalytic cracking according to the invention.

In a preliminary step of a process according to the invention, the solid waste material in divided form is introduced into a conveyor, named drying conveyor, with a rotating screw in an outer envelope brought to a temperature suitable for allowing heating of said solid waste material, evaporation of at least a portion of the moisture thereof and at least partial drying thereof. Said drying conveyor also has a column for condensing the water vapour released from the solid waste material in divided form. This heating step results in a waste material, named dry waste material, having a percentage of moisture of between 8% and 10% on exiting said drying conveyor, and which is suitable to be subsequently subjected to catalytic cracking according to the invention.

An amount of said dry waste material and an amount of liquid which is inert with respect to catalytic cracking are then mixed. This mixing is performed by means of a screw conveyor extending at the outlet of said drying conveyor, the rotational axis of the screw of which is substantially vertical and the direction of rotation of the screw of which is adapted so that said transfer conveyor conveys said dry waste material downwards to a bath of inert liquid, the screw of the transfer conveyor dipping in the bath of inert liquid so as to introduce the dried waste material into the bath of inert liquid. This configuration makes it possible in particular to promote the dispersion of said dry waste material in the bath of inert liquid and to prevent blocking of the device by clogging during the contact of said dry waste material and of the inert liquid.

In a process according to the invention, the mixture is subjected to heating to a temperature of 150° C. during its transfer into a conveyor a phase of degassing at a pressure below atmospheric pressure during heating of the mixture [sic].

A treatment by catalytic cracking is performed on the dried waste material so as to manufacture fuel at a rate of about 1000 L/h corresponding to a fuel production rate of about 0.24 kg/sec for a fuel density of 0.86. The dried waste material comprises about 70% (by mass of dry waste material) of cellulose-based waste material (for instance paper, cardboard, sanitary textiles) and about 30% (by mass of dry waste material) of synthetic polymeric waste material, including synthetic composite waste material.

Purely as a guide, the dried waste material has an elemental composition, expressed as mass percentage of the dry waste material, given in table 1 below, this elemental composition depending essentially on the origin and the nature of the waste material.

TABLE 1

| Carbon | $H_2$ | Sulfur | $O_2$ | $N_2$ | Cl |
|---|---|---|---|---|---|
| 53.5% | 7.7% | 0.5% | 37% | 0.7% | 0.6% |

The cracking yield for the cellulose-based waste material is about 32% and the cracking yield for the synthetic polymeric waste material is about 80%. The mean overall cracking yield for this waste material is about 46.4%.

The mass flow rates of the reagents (entering agents) and of the fuel nroduced are given in table 2 below

TABLE 2

| Flow rate of entering agents, kg/sec | | | | Total entering agents | Flow rate of fuel, kg/sec |
|---|---|---|---|---|---|
| Waste material | Oil | Lime | Catalyst | | |
| 0.52 | 3.75 | 0.017 | 0.005 | 4.3 | 0.24 |

The invention may be the subject of numerous variants and applications other than those described hereinabove. In particular, it goes without saying that, unless otherwise indicated, the various structural and functional characteristics of each of the embodiments described hereinabove must not be considered as combined and/or strictly and/or inextricably linked to each other, but, on the contrary, as simple juxtapositions. In addition, the structural and/or functional characteristics of the various embodiments described hereinabove may form the subject totally or partly of any different juxtaposition or of any different combination. For example, the dimensioning, the spatial organization and the design of the various constituent elements of the device are subject to an infinite number of variants.

The invention claimed is:

1. A process for producing energy products by catalytic cracking of a hydrocarbon solid material, in which a dispersion, named cracking dispersion, is heated, said dispersion comprising:
   a solid material in divided form containing at least one hydrocarbon-based compound;
   at least one catalytic cracking catalyst;
   at least one alkaline compound; and
   an inert liquid with respect to catalytic cracking;
   such that said cracking dispersion reaches a temperature, named cracking temperature, between 240° C. and 340° C. which is suitable to allow catalytic cracking of the at least one hydrocarbon-based compound of said cracking dispersion, leading to a production of hydrocarbons, named short-chain hydrocarbons, of lower molecular mass than said hydrocarbon-based compound;
   wherein said cracking temperature is reached by mixing an amount of said cracking dispersion and an amount of said inert liquid which is substantially free of solid material in divided form and of catalyst, the inert liquid being brought to a temperature below 360° C. and above said cracking temperature, said mixing being performed such that the mixture of said cracking dispersion and of an amount of said inert liquid that is substantially free of solid material in divided state and substantially free of catalytic cracking catalyst, reaches a temperature at least equal to said cracking temperature and below a temperature sufficient for coke formation under conditions of said catalytic cracking of the hydrocarbon-based compound, and in that an amount of an oxygenated gaseous composition capable of bringing about an exothermic reaction with at least a portion of dihydrogen produced during the catalytic cracking is supplied to said cracking dispersion at said cracking temperature.

2. The process according to claim 1, further comprising a step of drying the solid material in divided form is performed, during which a dispersion of the solid material in divided form in said inert liquid is maintained at a temperature above 100° C. so as to form a dispersion of a solid material, named dry material, in divided form having a moisture content of less than 10% in said inert liquid.

3. The process according to claim 1, further comprising a step of deoxygenation of the solid material in divided form is performed, during which a dispersion of the solid material in divided form in said inert liquid at the cracking temperature is kept in contact with a gaseous atmosphere with an oxygen partial pressure value less than the partial pressure of oxygen of atmospheric air so as to form a deoxygenated dispersion of the solid material in divided form in the inert liquid.

4. The process according to claim 3, further comprising a step of mixing in a continuous stream is performed, in which the following are placed in contact and mixed:
   a stream of the deoxygenated dispersion of said dry material in the inert liquid;
   at least one catalytic cracking catalyst;
   at least one alkaline compound; and
   a stream of the inert liquid;
   so as to form a stream of said cracking dispersion having a temperature below said cracking temperature, and in which at least one catalytic cracking catalyst is in contact with at least one hydrocarbon-based compound of the solid material in divided form.

5. The process according to claim 4, wherein a stream of the inert liquid is heated so that the stream of the inert liquid reaches a temperature above said cracking temperature.

6. The process according to claim 5, wherein the following are chosen and adjusted:
   the temperature of the stream of the inert liquid,
   the temperature of the stream of said cracking dispersion,
   a flow rate of the stream of the inert liquid, and
   a flow rate of the stream of said cracking dispersion;
   so that the temperature of the mixture of said cracking dispersion and of an amount of said inert liquid that is substantially free of solid material in divided state and substantially free of catalytic cracking catalyst reaches a temperature at least equal to the cracking temperature and below said temperature sufficient for coke formation.

7. The process according to claim 1, wherein since said cracking dispersion brought to a temperature at least equal to said cracking temperature forms a foam, named cracking foam, due to the catalytic cracking reaction, said cracking foam is subjected to a step of centrifugation via which separation is performed of a gaseous phase and of a solid/liquid mixed composition formed from a dispersion of solid matter obtained from the catalytic cracking in the inert liquid.

8. The process according to claim 7, wherein condensation of the gaseous phase is performed under conditions suitable for forming the energy products.

9. The process according to claim 7, wherein the solid/liquid mixed composition obtained from the centrifugation step is subjected to a liquid/solid separation step in which the inert liquid substantially free of solid matter is formed, and the recovered inert liquid is then recycled to the catalytic cracking.

* * * * *